(12) United States Patent
Hooper et al.

(10) Patent No.: US 12,128,499 B2
(45) Date of Patent: Oct. 29, 2024

(54) METHODS, SYSTEMS AND ASSEMBLIES FOR LASER DEPOSITION

(71) Applicant: LaserBond Limited, Smeaton Grange (AU)

(72) Inventors: Gregory Hooper, Cavan (AU); Wayne Hooper, Cavan (AU)

(73) Assignee: LaserBond Limited, Smeaton Grange (AU)

( * ) Notice: Subject to any disclaimer, the term of this patent is extended or adjusted under 35 U.S.C. 154(b) by 0 days.

(21) Appl. No.: 16/498,970

(22) PCT Filed: Mar. 29, 2018

(86) PCT No.: PCT/AU2018/050297
§ 371 (c)(1),
(2) Date: Sep. 27, 2019

(87) PCT Pub. No.: WO2018/176101
PCT Pub. Date: Oct. 4, 2018

(65) Prior Publication Data
US 2021/0086298 A1   Mar. 25, 2021

(30) Foreign Application Priority Data
Mar. 29, 2017   (AU) .................................. 2017901140

(51) Int. Cl.
*B23K 26/144* (2014.01)
*B05B 7/14* (2006.01)
(Continued)

(52) U.S. Cl.
CPC .......... *B23K 26/144* (2015.10); *B05B 7/1486* (2013.01); *B23K 26/123* (2013.01);
(Continued)

(58) Field of Classification Search
CPC .............. B23K 26/1464; B23K 26/144; B23K 26/146; B23K 26/123; B23K 26/147;
(Continued)

(56) References Cited

U.S. PATENT DOCUMENTS 4,659,901 A * 4/1987 Rieben ................. B23K 26/127
219/121.63
4,724,299 A * 2/1988 Hammeke ............. B05B 7/1486
219/121.6
(Continued)

FOREIGN PATENT DOCUMENTS

CN   103132072 A   6/2013
CN   203393228 U   1/2014
(Continued)

OTHER PUBLICATIONS

Machine English Translation of WO-2016042793-A1 (Year: 2016).*
(Continued)

*Primary Examiner* — Janie M Loeppke
*Assistant Examiner* — Erwin J Wunderlich
(74) *Attorney, Agent, or Firm* — Nixon Peabody LLP

(57) ABSTRACT

A workpiece positioning system for holding and manipulating a workpiece. The system includes a rail, a headstock assembly, and a tailstock assembly. The tailstock assembly is mountable to the rail in spaced relation to the headstock assembly to enable the workpiece to be supported between the headstock assembly and the tailstock assembly. The tailstock assembly includes a locking mechanism operable between a locking position in which the tailstock assembly is lockable against the rail in a desired position relative to the headstock, and an unlocked position in which the tailstock assembly is adapted to traverse the rail. The invention also provides a powder injection nozzle having a body and aa tube releasably connected to the body. The tube defines a
(Continued)

through passage having at least one inlet for receiving a cladding material and an outlet for delivering the cladding material from the tube.

20 Claims, 8 Drawing Sheets

(51) Int. Cl.
  *B23K 26/12* (2014.01)
  *B23K 26/14* (2014.01)
  *B23K 26/146* (2014.01)
  *B23K 26/34* (2014.01)

(52) U.S. Cl.
  CPC .......... *B23K 26/146* (2015.10); *B23K 26/147* (2013.01); *B23K 26/1494* (2013.01); *B23K 26/34* (2013.01)

(58) Field of Classification Search
  CPC ................ B23K 26/1494; B23K 26/34; B32K 16/1488; B05B 7/1486
  USPC .................................................... 219/121.84
  See application file for complete search history.

(56) References Cited

U.S. PATENT DOCUMENTS

| | | | | |
|---|---|---|---|---|
| 4,726,715 A * | 2/1988 | Steen | ..................... | B65G 65/46 |
| | | | | 198/662 |
| 4,807,814 A | 2/1989 | Douche et al. | | |
| 5,304,771 A * | 4/1994 | Griffin | ................... | B23K 9/324 |
| | | | | 219/121.84 |
| 5,453,329 A * | 9/1995 | Everett | ................ | C23C 24/103 |
| | | | | 428/565 |
| 5,477,025 A * | 12/1995 | Everett | ................ | B23K 26/144 |
| | | | | 219/121.84 |
| 5,486,676 A * | 1/1996 | Aleshin | ................ | B23K 26/144 |
| | | | | 219/121.63 |
| 6,396,025 B1 * | 5/2002 | Pyritz | .................. | B23K 26/144 |
| | | | | 219/121.47 |
| 6,601,782 B1 * | 8/2003 | Sandholm | ............. | B05B 7/0815 |
| | | | | 239/600 |
| 7,038,162 B2 * | 5/2006 | Baker | ................ | B23K 26/0096 |
| | | | | 219/121.84 |
| 8,297,478 B2 * | 10/2012 | Hughes | .................. | G01F 13/005 |
| | | | | 198/525 |
| 9,829,031 B2 * | 11/2017 | Sessa | ....................... | F16B 37/00 |
| 2005/0056628 A1 * | 3/2005 | Hu | ....................... | B23K 26/144 |
| | | | | 219/121.84 |
| 2008/0308538 A1 * | 12/2008 | Harris | .................... | B23K 26/34 |
| | | | | 219/121.84 |
| 2009/0291197 A1 | 11/2009 | Bartels | | |
| 2011/0297083 A1 * | 12/2011 | Bartels | ............... | B23K 26/0823 |
| | | | | 118/712 |
| 2012/0199564 A1 * | 8/2012 | Washko, Jr. | .......... | B23K 26/34 |
| | | | | 219/121.63 |
| 2014/0186549 A1 * | 7/2014 | Miyagi | ..................... | B05B 1/24 |
| | | | | 427/554 |
| 2016/0221014 A1 * | 8/2016 | Nardi | .................... | B05B 7/1486 |
| 2018/0036837 A1 | 2/2018 | Nagai | | |
| 2018/0133956 A1 * | 5/2018 | Buller | .................. | B29C 64/357 |

FOREIGN PATENT DOCUMENTS

| | | | | |
|---|---|---|---|---|
| GB | | 2228224 A | 8/1990 | |
| GB | | 2533102 A | 6/2016 | |
| WO | WO-2016042793 A1 * | | 3/2016 | ............. B22F 10/20 |
| WO | | 2016132502 A1 | 8/2016 | |

OTHER PUBLICATIONS

International Search Report for International Patent Application No. PCT/AU2018/050297, mailed Jul. 3, 2018 (4 pages).
Written Opinion of International Searching Authority for International Patent Application No. PCT/AU2018/050297, mailed Jul. 3, 2018 (5 pages).

* cited by examiner

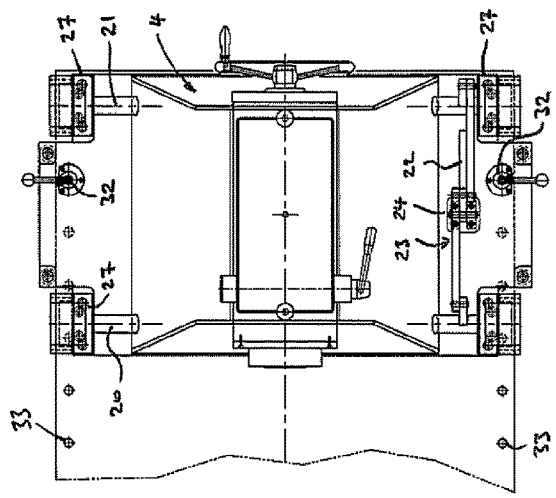
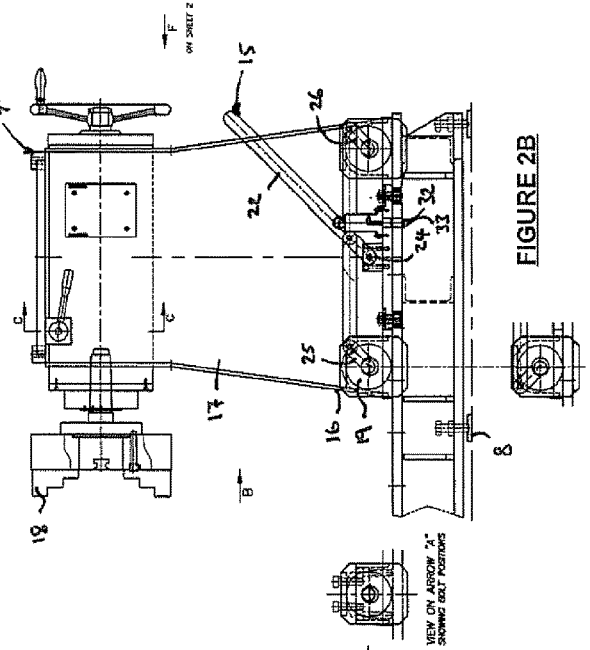
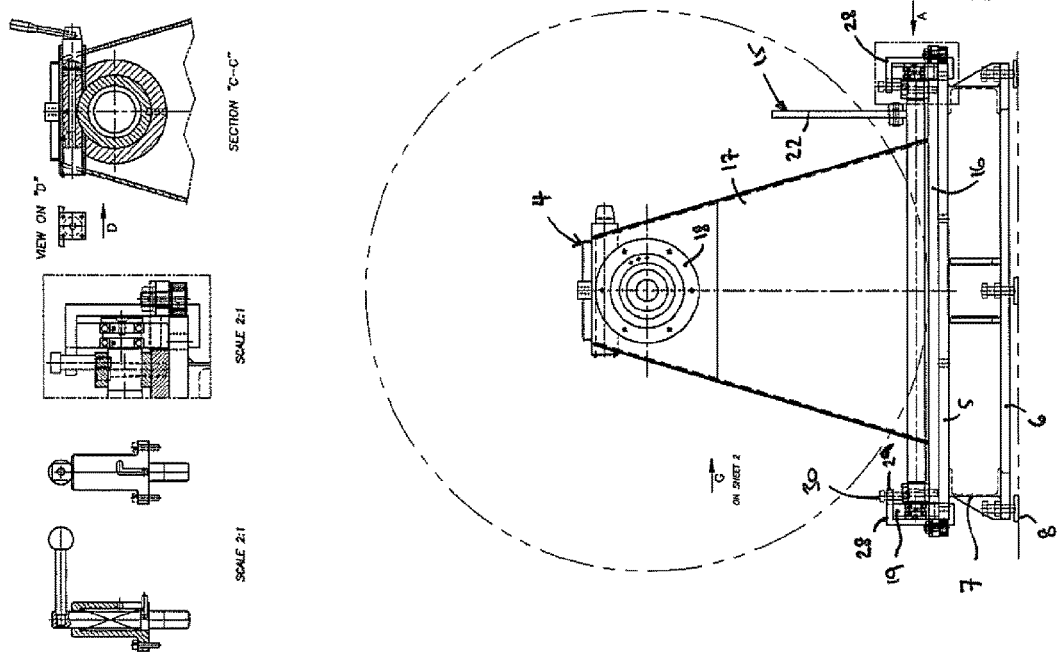
FIGURE 2C
FIGURE 2B
FIGURE 2A

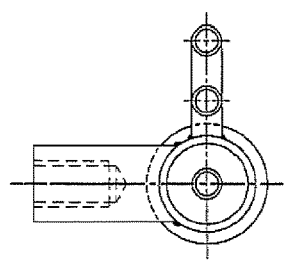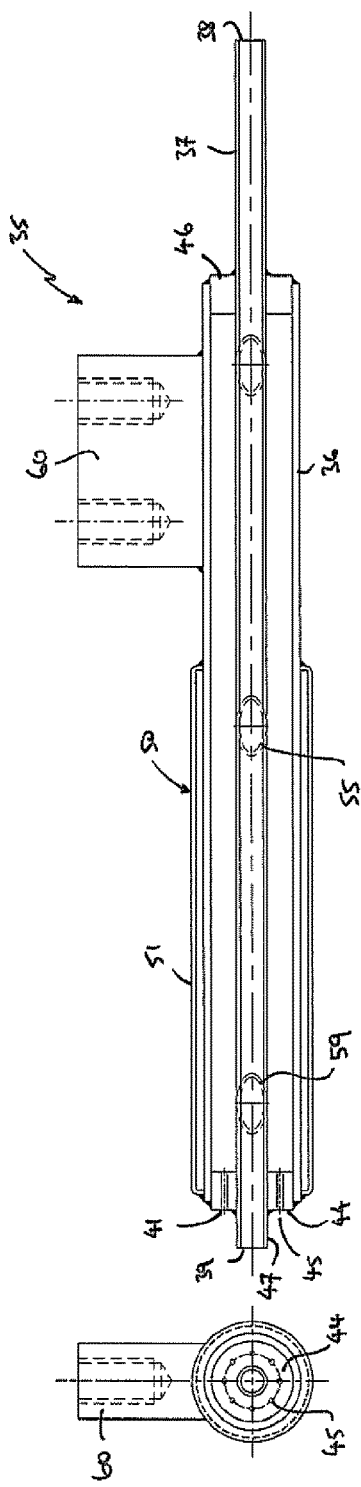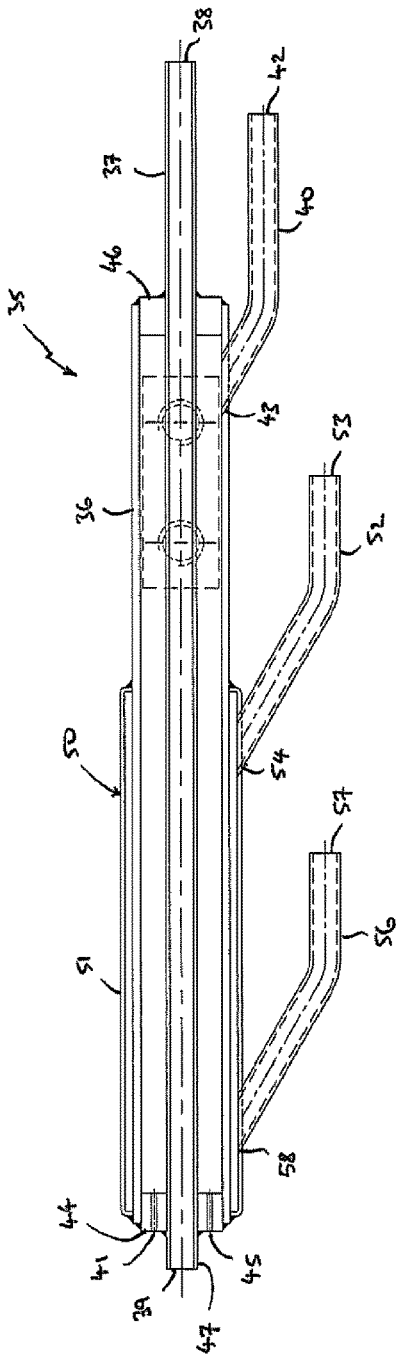

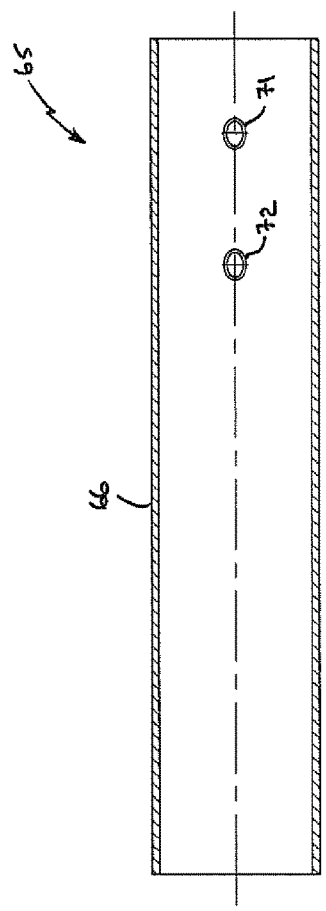
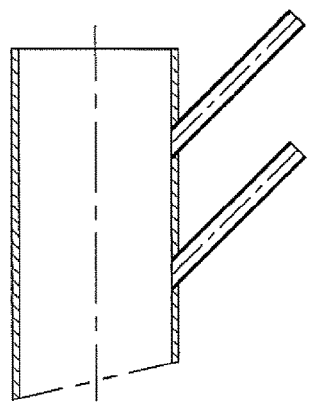
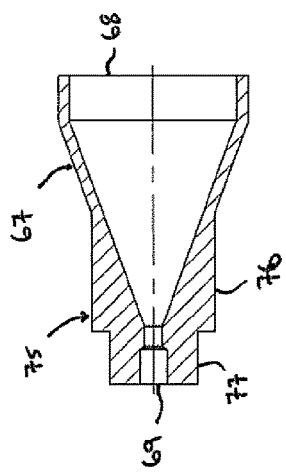
FIGURE 6A
FIGURE 6B
FIGURE 6C

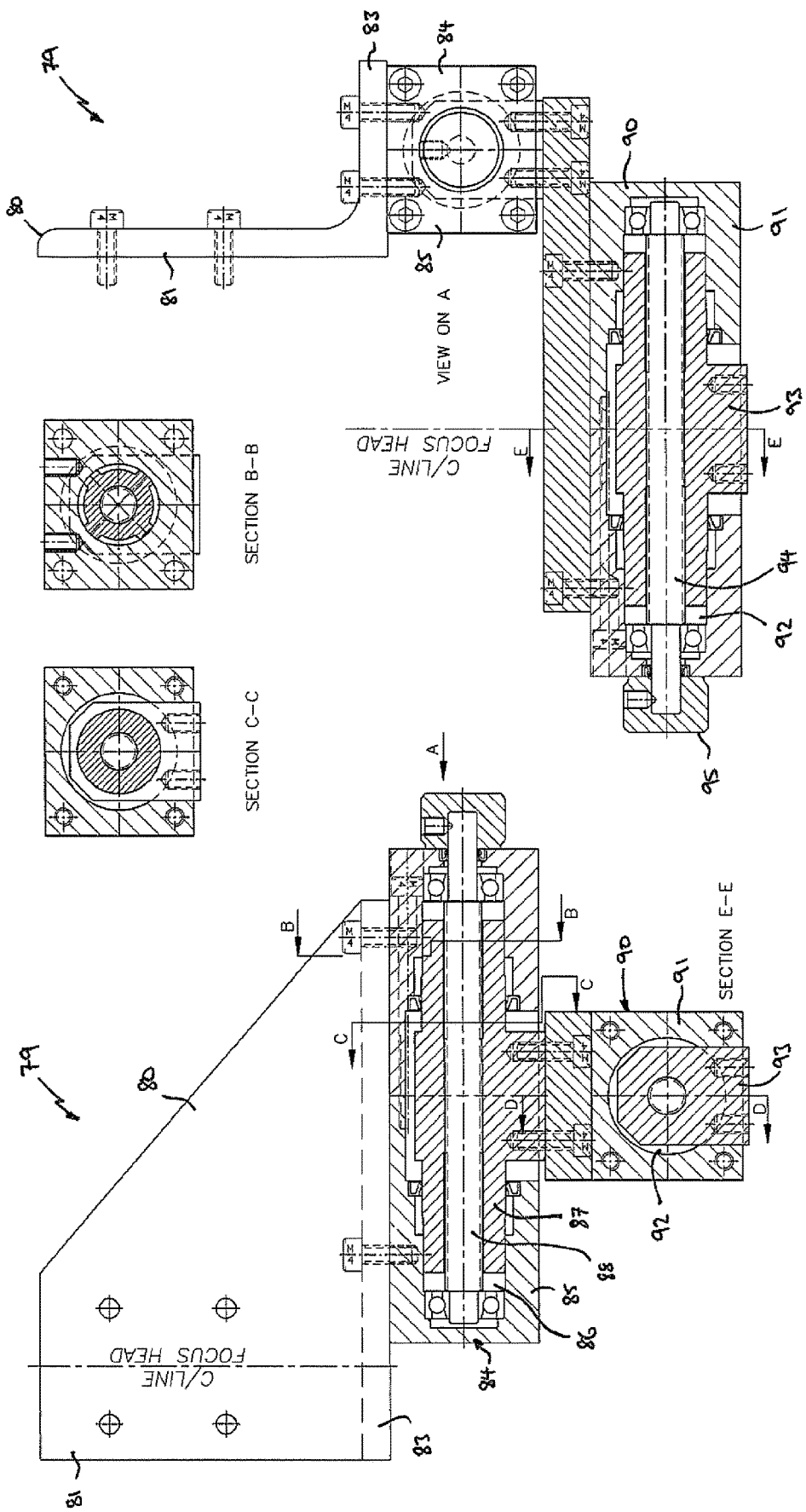

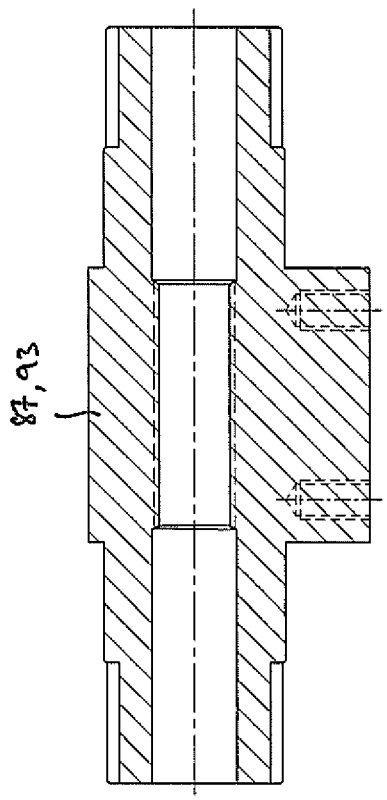
FIGURE 8A
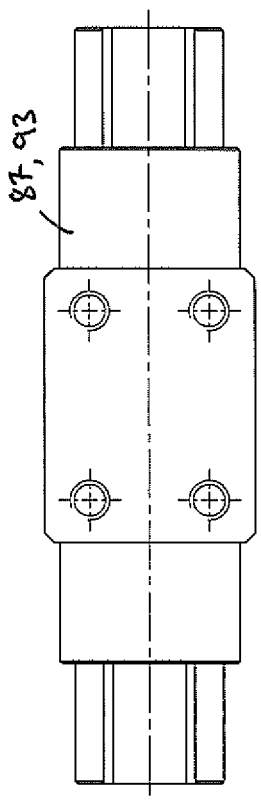
FIGURE 8B
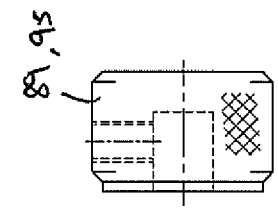
FIGURE 8C
FIGURE 8D
FIGURE 8E

METHODS, SYSTEMS AND ASSEMBLIES FOR LASER DEPOSITION

CROSS-REFERENCE TO RELATED APPLICATIONS

This application is U.S. National Stage of International Application No. PCT/AU2018/050297, filed Mar. 29, 2018, which claims the benefit of and priority to Australia Patent Application No. AU 2017 901140, filed Mar. 29, 2017, all of which are incorporated herein by reference in their entireties.

FIELD OF THE INVENTION

The present invention relates generally to methods, systems and assemblies for deposition of metallurgically bonded layers onto surfaces of metallic substrates, by laser deposition.

A common purpose for surface coatings is to tailor or improve wear resistance characteristics and the present invention will be described primarily with reference to such applications. It should be appreciated, however, that the invention may be utilised for application of surface layers and coatings for a broad range of functional, structural and aesthetic applications including but not limited to wear or abrasion resistance, thermal insulation, corrosion and chemical resistance, electrical conductivity or resistivity, medical or bio-medical compatibility, RFI/EMI shielding, surface colour, pattern or texture, dimensional restoration and cosmetic repair.

Again, however, it should be appreciated that various forms of the invention are not limited to this particular field of use, being potentially applicable to a wide range of industrial applications and related machinery where control of, and relative positioning between, various elements and component parts of an integrated system is advantageous.

BACKGROUND OF THE INVENTION

The following discussion of the prior art is intended to frame the invention in an appropriate technical context and allow the associated advantages to be more fully understood. It should be appreciated, however, that any references to prior art should not be construed as an express or implied admission that such art, or any associated disadvantages or limitations, are widely known or part of common general knowledge in the field.

Several methods have hitherto been used for depositing wear resistant layers onto metal substrates, including thermal spraying, spray and fuse, and laser cladding techniques.

Laser cladding utilises controlled energy from a laser source to bond a surfacing material to a metallic component. Laser cladding techniques utilise the energy of a laser beam to form a metallurgically bonded layer on the metal base. Lasers that may be used for this purpose include $CO_2$, Nd:YAG, Nd:YVO$_4$, Diode, Disc and Fibre lasers.

Laser based systems provide a number of advantages over other techniques including highly variable energy adjustment, strong metallurgical bonds, lower dilution with the base metal, smaller heat affected zones, lower deleterious heat affects to the base material and deposited layer, minimal distortion, and high heating and cooling rates resulting in relatively fine microstructures and metastable phases.

However, known laser cladding system are typically difficult to set up, with only limited adjustability available to accommodate complex and irregular shaped components. In addition, such systems are typically adapted for use with relatively small and lightweight components with little or no capacity for larger workpieces.

Coaxial laser cladding heads typically include a laser beam projecting from the centre of the cladding head. The laser beam is positioned to project as a spot on the surface of a component.

Powder is directed under pressure toward a component to which a cladding is to be applied from points located around the laser beam. The streams of powder are directed to focus on a single region within or adjacent the laser spot. Such a co-axial system is relatively insensitive to the direction that the cladding head is travelling. However, the pressurised powder often bounces off the component to be clad and adjustability of the powder supply is low.

In an off-axis system the laser beam and stream of powder are not co-axial but rather are directed toward the component from adjacent sources. Here, the rate of material applied to the laser spot can be more easily and accurately controlled, however, it remains difficult to accurately position and adjust the nozzle relative to the laser beam.

To improve efficiency and accuracy of heat transfer delivered by a laser cladding system, the tip of the powder injection tube must be located in very close proximity to a high energy, focussed laser beam. This close proximity necessarily ensures that the nozzle tip is prone to excessive heat which can melt the tip by way of direct or reflected laser energy, leading to generally inefficient systems and relatively long downtimes for maintenance and repair with associated losses in production time and related labour costs. These disadvantages are magnified when working with components of complex or irregular geometry.

Consequently, the full potential benefits of laser cladding techniques are often not realised in practice, and reflected in real-world performance.

It is an object of the invention to overcome or substantially ameliorate one or more of the disadvantages or limitations of the prior art, or at least to provide a useful alternative.

SUMMARY OF THE INVENTION

According to one aspect of the present invention, there is provided a workpiece positioning system for holding and/or manipulating a workpiece or component, the system including:

a rail;

a headstock assembly; and a tailstock assembly mountable to the rail in spaced apart relation relative to the headstock assembly, thereby to enable the workpiece to be supported between the headstock assembly and the tailstock assembly;

wherein the tailstock assembly includes a locking mechanism operable between a locking position in which the tailstock assembly is lockable against the rail in a desired position relative to the headstock, and an unlocked position in which the tailstock assembly is adapted to traverse the rail.

In some embodiments, the rail has an upper rail plate defining a surface for carrying the headstock assembly and/or tailstock assembly. The surface of the upper rail plate is preferably planar. In some embodiments, the upper rail plate is formed as a single piece of plate material, preferably metal plate. In other embodiments, the upper rail plate may be formed from two or more rail plate members arranged in contiguous end-to-end relation.

In some embodiments, the rail includes a base plate extending in parallel spaced apart relation relative to the upper support plate. In some embodiments, the base plate is formed as a single piece of plate material, preferably metal plate. In other embodiments, the base plate may be formed from two or more base plate members arranged in contiguous end-to-end relation.

Preferably, rail includes side edge members extending at or adjacent to respective sides of the upper rail member, the side edge members extending longitudinally and parallel to a central longitudinal axis of the upper rail plate. In some embodiments, each side edge member is formed by an elongate member such as, for example, a bar, channel, tube, beam, U-beam, C-channel, SHS, RHS or the like.

Preferably, the rail includes a plurality of support elements, each support element having a ground engaging portion and being adjustable in height to facilitate levelling of the upper rail plate.

In some embodiments, the side edge members of the rail are arranged inwardly of the associated edges of the upper rail plate, thereby to define a protruding lip or catch to which a complementary engaging potion of the tailstock assembly is engagable. The rail lip and complementary engaging portions of the tailstock assembly advantageously provide for secure and positive engagement of the tailstock assembly on the rail as well as assisting to ensure true tracking of the tailstock assembly along the rail, in use. In some embodiments, each engaging portion of the tailstock assembly has a generally constant cross-sectional profile having, for example, an L-, C- or U-shaped engaging profile.

In some embodiments, the headstock assembly is mountable to the rail. In some embodiments, the headstock assembly is fixedly mounted to the rail, whereby a distance between the headstock and tailstock assemblies is set by selective movement of the tailstock assembly along the rail (i.e. towards or away from the headstock assembly). In certain embodiments, the headstock assembly is selectively movable along the length of the rail, thereby to enable positioning of the headstock assembly relative to the tailstock assembly.

In some embodiments, the headstock assembly has a base surface adapted to bear against the upper rail surface. Preferably, the headstock assembly has engaging formations for securely engaging the rail lip along each side edge of the upper rail plate. The engaging formations of the headstock assembly are preferably complementary to the profile of the respective rail lips, thereby to provide secure and positive engagement of the headstock assembly on the rail as well as assisting to ensure true tracking of the headstock assembly along the rail, in use.

In other embodiments, the headstock assembly is mounted adjacent to an end of the rail. In such embodiments, the headstock assembly is preferably fixedly mounted to a floor or foundation. In some embodiments, each engaging portion of the headstock assembly has a generally constant cross-sectional profile having, for example, an L-, C- or U-shaped engaging profile.

In some embodiments, the headstock assembly has a base for engaging the rail and a carrier mounted to the base and adapted to carry or support the workpiece or component, in use. In some embodiments, the base is adapted to facilitate sliding movement of the headstock assembly along the rail. Preferably, the base of the headstock assembly is secured to the rail by one or more fasteners; for example, bolts threadingly engaging the rail.

In some embodiments, the headstock assembly has a support structure extending upwardly from the base for supporting the carrier at a predetermined height above the rail. In certain embodiments, the support structure includes two support posts mounted to the base, with the carrier mounted therebetween.

In some embodiments, the carrier is in the form of a chuck. Preferably, the chuck is adapted for rotation about a first axis ('axis of rotation'). The chuck is preferably adapted for tilting movement about a second axis ('tilt axis') orthogonal to the first axis.

Preferably, the headstock assembly includes a first drive means for rotating the chuck about its axis of rotation or first axis. In some embodiments, the chuck can be driven by the first drive means to rotate at a desired rotational speed (i.e. rpm) through 360 degrees, either clockwise or counter-clockwise about first axis. The first drive means preferably includes an electric motor with a reduction gearbox. In some embodiments, the headstock assembly includes a drive housing for housing the first drive means. The drive housing is preferably connected to the chuck such that the chuck and drive housing move together and tilt about the second or tilt axis.

Preferably, the headstock assembly includes a second drive means for tilting the chuck about its tilt axis. In some embodiments, the second drive means is configured to enable the chuck to be tilted about its tilt axis through a range of 0 to 90 degrees relative to the longitudinal axis of the rail, as desired. The second drive means preferably includes an electric motor and reduction gearbox. Preferably, the second drive means can hold the chuck at a desired (fixed) tilt angle, thereby to enable the first drive means to rotate the chuck about its axis of rotation whilst tilted, in use. It will be appreciated that, when the chuck is tilted, the axis of rotation is tilted and at an angle relative to the rail.

Preferably, the chuck can be driven by the first drive means to rotate at a desired rotational speed (i.e. rpm) through a complete 360 degrees, either clockwise or counter-clockwise about the first axis. The first drive means preferably includes an electric motor with a reduction gearbox. Preferably, the first drive means is able to rotate the chuck at a constant rotational speed. In certain embodiments, the first drive means is configured to enable rotation of the chuck at rotational speeds of up to 50 rpm (approximately 5 rad.s$^{-1}$).

In some embodiments, the headstock assembly includes a first drive housing for housing the first drive means. The first drive housing is preferably connected to the chuck (e.g. via a shaft extending between the chuck and the gearbox) such that the chuck and first drive housing move together and tilt about the second or tilt axis.

In some embodiments, the headstock assembly includes a second drive housing for housing the second drive means. The second drive housing is preferably connected to the chuck and first drive housing, whereby activation of the second drive means causes the chuck and first drive housing to tilt about the tilt axis.

In some embodiments, the chuck is a four jaw chuck. Preferably, each jaw of the four jaw chuck can be moved independently of the other jaws, thereby to facilitate mounting of regular or irregular shaped components or workpieces.

In some embodiments, the chuck is a three jaw chuck. Preferably, all jaws of the three jaw chuck move together and are arranged so that each jaw is the same distance from the centre of the chuck (i.e. from the first axis or its axis of rotation).

Preferably, the movement of the jaws is controlled by a scroll plate which is selectively and manually rotated by a chuck key.

In some embodiments, the chuck has a central opening, thereby to enable passage of a shaft therethrough. In certain embodiments, the central opening may be circular and have a relatively large open diameter, for example, an open diameter of approximately 130 mm.

Preferably, the headstock assembly can be configured to have capacity for relatively light and/or heavy duty operation and for handling a range of workpiece sizes. In some embodiments, the headstock assembly may be adapted to handle workpieces having (a) a weight of up to 10,000 kg or more, (b) a length of up to 5 m or more, and (c) a diameter of up to 1,000 mm or more.

In some embodiments, the tailstock assembly has a base with a base surface adapted to bear against the upper rail surface of the rail when the locking mechanism is in the locking position. Preferably, the tailstock assembly has a support structure extending upwardly from the base, the support structure being configured to hold a centring unit in coaxial alignment with the carrier of the headstock assembly (i.e. when the carrier/chuck is at 0 degree tilt angle relative to the rail and the axis of rotation is parallel with the longitudinal axis of the rail). In some embodiments, the centring unit of the tailstock assembly is a chuck, preferably a three jaw or four jaw chuck, for supporting the distal end of the component or workpiece (i.e. the other end of the workpiece to that supported by the chuck of the headstock assembly).

In some embodiments, the base includes a friction reducing element operatively associated with the locking mechanism, whereby when the locking mechanism is in the unlocked position the friction reducing element can bear against (in engaging contact) the rail to allow movement of the base (and tailstock assembly) relative to the rail (towards and away from the headstock assembly).

In some embodiments, the friction reducing element includes at least one wheel. In some embodiments, the friction reducing element includes a set of four wheels, with a first pair of wheels arranged on a first (e.g. left) side of the base and a second pair of wheels arranged on a second (e.g. right) side of the base. Preferably, each pair of wheels includes a front wheel and a rear wheel.

The front wheels are preferably connected together by a shaft such that rotation of the shaft causes a corresponding rotation of the front wheels. Preferably, the rear wheels are connected together by a shaft such that rotation of the shaft causes a corresponding rotation of the rear wheels.

In some embodiments, the locking mechanism includes a selectively operable lever arranged and configured to move the friction reducing element relative to the bed, wherein when the lever is in a first position corresponding to the locking position the friction reducing element is moved out of contact with the rail and the base bears against the rail, and when the lever is in a second position corresponding to the unlocked position the friction reducing element is moved into contact with the bed to enable movement of the base relative to the rail.

Preferably, the front wheels are eccentrically mounted to the respective shaft such that the centre of each wheel is offset from the axis of rotation of the shaft, thereby to facilitate the movement of the front wheels into and out of contact with the rail bed upon rotation of the shaft.

Preferably, the rear wheels are eccentrically mounted to the respective shaft such that the centre of each wheel is offset from the axis of rotation of the shaft, thereby to facilitate the movement of the rear wheels into and out of contact with the rail bed upon rotation of the shaft.

In some embodiments, the lever of the locking mechanism is pivotally mounted at its proximal end to the base and operatively connected to the friction reducing element (e.g. wheels) via one or more linkage arms. Preferably, a first linkage arm has one end connected to the lever adjacent the pivot point and another end connected to the front shaft, preferably via a lug fixedly attached to the front shaft, whereby movement of the lever about its pivot causes a corresponding rotation of the front shaft and the associated front wheels. Preferably, a second linkage arm has one end connected to the lever adjacent the pivot point and another end connected to the rear shaft, preferably via a lug fixedly attached to the rear shaft, whereby movement of the lever about its pivot causes a corresponding rotation of the rear shaft and the associated rear wheels.

In some embodiments, the front and rear shafts are fixedly secured to the base via shaft mounting blocks (i.e. respective left and right blocks), with the shaft passing through a hole formed in each block and the respective ends of the shafts protruding from the blocks such that the wheels are mounted outwardly of the shaft mounting blocks. Preferably, a cover member is arranged over each wheel, each cover having a cavity for at least partially receiving the associated wheel. Each cover member preferably mountable to the respective shaft mounting block at one point and engagable with the rail at another point, thereby to enable the base of the tailstock to (slidably and upwardly) move relative to the rail upon rotation of the eccentrically mounted wheels via operation of the lever.

In some embodiments, each cover member has engaging formations for engaging the rail lip along each side edge of the upper rail plate. The engaging formations of each cover are preferably complementary to the profile of the respective rail lips, thereby to assist with true tracking of the tailstock assembly along the rail, in use. In some embodiments, each engaging portion of the cover has a generally constant cross-sectional profile having, for example, an L-, C- or U-shaped engaging profile, adapted to receive a portion of a respective edge of the rail.

Preferably, an operatively upper end of each cover has one or more openings for receiving corresponding guide pins extending (upwardly) from the respective shaft mounting block, the upper end being vertically spaced from the mounting block, thereby to enable the base of the tailstock to (slidably and upwardly) move relative to the rail upon rotation of the eccentrically mounted wheels.

In some embodiments, the base of the tailstock assembly and the rail include complementary connectors for locking the base relative to the rail. These connectors may be in the form of locking members (e.g. pins) associated with the base and corresponding receiving formations (e.g. holes or catches) in the rail. Preferably, the pins are spring loaded to allow the base to move across the bed until the pin aligns with a hole, whereby the pin is spring forced into the hole.

Advantageously, the lever system is able to be manually released and the base moved by a single operator. This configuration is particularly advantageous in situations where it is desirable that no lubricant is used on the rail or machine bed on which the base is positioned. This may occur, for example in laser cladding, where debris such as metal powder falls on the rail or bed during operation and needs to be swept off.

According to another aspect of the present invention, there is provided a workpiece positioning system for holding and/or manipulating a workpiece or component, the system including:

a tailstock assembly mountable to a base in spaced apart relation relative to a headstock assembly, thereby to enable the workpiece to be supported between the headstock assembly and the tailstock assembly;

wherein the tailstock assembly includes a locking mechanism operable between a locking position in which the tailstock assembly is lockable against the base in a desired position relative to the headstock, and an unlocked position in which the tailstock assembly is adapted to traverse the base.

According to another aspect of the invention, there is provided a machine base locatable on a machine bed or rail, the base including:

at least one wheel;

a lever configured to move the wheel relative to the bed;

wherein when the wheel is moved out of contact with the bed the base is fixed in position on the bed and when the wheel is moved into contact with the bed, the base is moveable relative to the bed.

In some embodiments, the machine base may form the base of the headstock. In some embodiments, the machine base may form the base of the tailstock.

Preferably when the lever is moved in a first direction, the at least one wheel is raised out of contact with the bed and when the lever is moved in a second direction the at least one wheel is lowered into contact with the bed.

Preferably, the base includes at least one abutment surface corresponding to the at least one wheel, wherein when the at least one wheel is moved out of contact with the bed the corresponding abutment surface is moved into contact with the bed thereby to prevent movement of the base and when the at least one wheel is moved into contact with the bed, the corresponding abutment surface is moved away from the bed to allow movement of the base relative to the bed.

Preferably the bed includes a pair of mutually opposed outwardly facing surfaces. In use, the at least one wheel is preferably located adjacent a first surface of the bed and the corresponding abutment surface is located adjacent a second opposed surface of the bed. When the at least one wheel is moved out of contact with the first surface of the bed the corresponding abutment surface is moved into contact with the second surface of the bed and when the at least one wheel is moved into contact with the first surface of the bed the corresponding abutment surface is moved out of contact with the second surface of the bed.

Preferably, the lever includes a handle for operator engagement to rotate the lever. The lever is rotatably connected at the opposite end to a first end of at least one arm. The second end of the arm is rotatably connected to a shaft. When the lever is rotated in the first direction, the arm is displaced laterally and the shaft is rotated around its axis. This rotation of the shaft acts to raise the wheel out of contact with the bed and raise the abutment surface into contact with the bed, thereby fixing the base. When the lever is rotated in the opposite second direction, the arm is displaced laterally in the opposite direction and the shaft is likewise rotated in the opposite direction around its axis. This rotation of the shaft acts to lower the wheel into contact with the bed and to lower the abutment surface out of contact with the bed, thereby allowing the base to be moved relative to the bed.

Preferably the base and bed include complementary connectors for locking the base relative to the bed. These may be in the form of pins in the base and corresponding holes in the bed. Preferably, the pins are spring loaded to allow the base to move across the bed until the pin aligns with a hole, whereby the pin is spring forced into the hole.

According to another aspect of the invention, there is provided a powder injection nozzle, including:

a body;

a tube releasably connected to the body, the tube defining a through passage having at least one inlet for receiving a cladding material and an outlet for delivering the cladding material from the tube.

In some embodiments, the body is an elongate hollow body. Preferably, the body is cylindrical. In some embodiments, the body has at least one inlet for receiving a gas and an outlet for ejecting the gas from the body, thereby to form a gas shield about the cladding material as it is delivered from the tube.

In some embodiments, the gas inlet is provided a gas inlet tube having a first free open for connection to a gas supply line and second fixed end fixed in or about a hole formed in a wall of the body, thereby to provide a passageway for the gas from the first free end to the interior of the body. In certain embodiments, the gas inlet tube includes a first portion defining the first free end and extending parallel to the longitudinal axis of the body and a second portion extending at an angle to the first portion. In some embodiments, the second portion extends at an angle in the range of 15-50 degrees relative to the first portion, preferably 20-45 degrees and more preferably 25-35 degrees. In one particularly preferred embodiment, the second portion extends at an angle of 30 degrees relative to the first portion.

Preferably, the (gas) outlet of the body is formed at the distal end of the tube. In some embodiments, the gas outlet is provided by an insert, such as for example a cap, collar, ring or plug, arranged at the distal end of the tube between the body and the tube, whereby the insert has one or more openings through which the gas can be delivered from the body. In some embodiments, the tube passes through an opening formed in the insert.

In some embodiments, the body has an inner diameter in the range of 8-25 mm, preferably 9-15 mm and more preferably 10-12 mm. Preferably, the length of the body is less than the length of the tube. In certain embodiments, the length of the body is in the range of 90-150 mm, preferably 100-140 mm and more preferably 110-130 mm.

In certain embodiments, the insert may include two or more openings arranged to form a polar array of openings about the tube. In certain embodiments, each opening may have a diameter equal to or less than 1 mm, preferably about 0.7 mm. In one particularly preferred embodiment, the insert includes a polar array with eight holes arranged about the tube. It will be appreciated that the number, size and arrangement of the holes may vary to suit a particular application and is not limited to those described herein.

Preferably, a closure member, such as for example a cap, collar, ring or plug, is sealingly arranged at the proximal end of the body between the body and the tube to prevent gas from escaping via the distal end of the body. In some embodiments, the tube passes through an opening formed in the closure member.

In some embodiments, the tube is an elongate hollow tube. Preferably, the tube is cylindrical. The diameter of the tube is preferably less than the diameter of the body. Preferably, the tube has a constant cross-sectional diameter along its length. In some embodiments, the tube has an outer diameter in the range of 2-7 mm, preferably 3-6 mm and more preferably 3.5-5 mm. In one preferred embodiment, the tube has an outer diameter of 4 mm and a wall thickness of 0.45 mm.

Preferably, the body and tube are coaxially aligned.

Preferably, the tube is configured to have an interference fit or a size-for-size fit with the insert and closure member in the body, thereby to facilitate removal and replacement of the tube for repair, maintenance and cleaning. In certain embodiments, the insert and closure member also may be releasably mounted within the body.

Preferably, the inlet of the tube is arranged at its proximal end. The outlet of the tube is preferably formed at its distal end. In certain embodiments, the length of the tube is in the range of 100-220 mm, preferably 140-180 mm and more preferably 150-170 mm. In one preferred embodiment, the tube has a length of 160 mm.

Preferably, the tube is fitted within the body such that the outlet projects from the distal end of the body, thereby to provide a nozzle tip. In such embodiments, the other end of the tube extends rearwardly from the proximal end of the body. The extent to which the nozzle tip projects forward of the distal end of the body is preferably less that the extent to which the other end of the tube extends rearwardly from the proximal end of the body. In one preferred embodiment, the nozzle tip projects approximately 5 mm forward of the distal end of the body. In certain embodiments, the inlet of the tube projects approximately 30-45 mm rearwardly of the distal end of the body.

The cladding material is preferably a powdered material or other particulate matter.

In some embodiments, the powder injection nozzle includes a fluid delivery unit for delivering a cooling fluid to the distal end region of the powder injection nozzle. Preferably, the fluid delivery unit includes a water cooling mechanism adapted to control and cool the temperature of the distal end of the tube (nozzle tip) and/or body, in use. The water cooling mechanism is particularly advantageous in laser cladding applications in which the nozzle tip is required to be located in very close proximity to a laser beam and thus subject to extreme temperatures which can result in premature failure or reduced working life of the powder injection nozzle, particularly the nozzle tip of the tube.

Preferably, the water cooling mechanism includes a sleeve fixed to and bounding at least a portion of the body, thereby to form an enclosed area between an inner surface of the sleeve and an outer surface or wall of the body. In some embodiments, sleeve is coaxially aligned with the body, whereby a cross-sectional profile of the enclosed area is in the form of an annulus or ring.

Preferably, the sleeve is arranged to bound a portion of the body at or adjacent to the distal end of the body. In some embodiments, the length of the sleeve is less than the length of the body. In certain embodiments, the sleeve is adapted to extend for approximately half the length of the body. It will be appreciated that, in other forms, the extent to which the sleeve extends along the body may be greater than or less than half the length of the body. In certain embodiments, the ratio of the length of the body to the length of the sleeve is approximately 2:1. In other embodiments, the ratio of the length of the body to the length of the sleeve is approximately 1.7:1. It will be appreciated that, in other forms, the extent to which the sleeve extends along the body is not limited to the above exemplary figures and, in particular, the length of the sleeve may be greater than or less than half of the length of the body.

In some embodiments, the sleeve of the water cooling mechanism includes at least a first inlet hole formed in the wall of the sleeve and through which water can be charged into the enclosed area between the sleeve and the body and circulated about the enclosed area, and a second outlet hole formed in the wall of the sleeve through which water can be discharged from the sleeve, thereby to cool the associated regions of the body, tube and nozzle tip in use.

In some embodiments, the water cooling mechanism includes a water inlet pipe having a first free open end for connection (via a hose or other suitable duct) to a water supply line and second fixed end fixed in or about the first inlet hole formed in the wall of the sleeve, thereby to provide a passageway for water to be charged to the enclosed area. In certain embodiments, the water inlet pipe includes a first portion defining the first free end and extending parallel to the longitudinal axis of the body and a second portion extending at an angle to the first portion. In some embodiments, the second portion extends at an angle in the range of 15-50 degrees relative to the first portion, preferably 20-45 degrees and more preferably 25-35 degrees. In one particularly preferred embodiment, the second portion extends at an angle of 30 degrees relative to the first portion.

In some embodiments, the water cooling mechanism includes a water outlet pipe having a first free open end for connection (via a hose or other suitable duct) to a water waste or recycling station and second fixed end fixed in or about the second outlet hole formed in the wall of the sleeve, thereby to provide a passageway for water to be discharged from the enclosed area. In certain embodiments, the water outlet pipe includes a first portion defining the first free end and extending parallel to the longitudinal axis of the body and a second portion extending at an angle to the first portion. In some embodiments, the second portion extends at an angle in the range of 15-50 degrees relative to the first portion, preferably 20-45 degrees and more preferably 25-35 degrees. In one particularly preferred embodiment, the second portion extends at an angle of 30 degrees relative to the first portion.

Preferably, the body, the tube, the insert, the closure member, the gas inlet pipe and the water inlet and outlet pipes are formed of a material suitable for withstanding higher working temperatures, such as a metal. In some embodiments, each element of the powder injection nozzle is formed from the same material. In certain embodiments, each element of the powder injection nozzle is formed from copper.

In some embodiments, a nozzle mounting bracket is provided to facilitate mounting of the powder injection nozzle. In certain embodiments, the nozzle mounting bracket is integrally formed with, or fixed connected to, the body, preferably adjacent the proximal end of the body. Preferably, the nozzle mounting bracket has one or more receiving formations such as for examples holes (threaded or clearance) or slots for accommodating complementary fasteners to mount the nozzle in a predetermined desired position, in use.

In some embodiments, the inlet of the tube of the powder injection nozzle is configured to be operatively connected to an outlet of a material feeder adapted to deliver the cladding material to the tube.

In some embodiments, the material feeder includes a powder tube with an inlet for fluid communication with a source or reservoir of the cladding material and an outlet in fluid communication with the inlet of the tube of the nozzle.

In some embodiments, the powder tube is an elongate cylindrical tube, preferably of constant cross-sectional diameter. In certain embodiments, the distal end of the powder tube has a funnel mounted thereto, the funnel defining the outlet of the material feeder. Preferably, the inlet of the funnel is sleevingly received over the outlet of the powder tube. The funnel preferably narrows from its inlet to a narrowed passageway which defines the outlet through which the cladding material exits and passes to the tube of the nozzle.

In some embodiments, the outlet of the material feeder is connected to the inlet of the tube of the nozzle via a connecting mechanism such as for example a powder connection hose with associated connectors (e.g. quick release hose connectors).

The cladding material is preferably delivered to the inlet of the material feeder as a cladding powder, preferably in a mixture with a carrier gas. In some embodiments, the carrier gas is nitrogen. Delivery of the cladding powder to the inlet of the feeder is preferably pressurised.

Preferably, the rate of delivery of the cladding material is controlled prior to delivery to the material feeder inlet. The material source and carrier gas source are each preferably connected to material feeder via a dedicated material source supply line and a dedicated carrier gas supply line. In some embodiments, the powder tube includes an end cap covering the (inlet) proximal end of the powder tube, the cap having a first inlet opening for connection with the material source line through which the cladding material may pass into the tube, and a second inlet for connection with the carrier gas source line through which the carrier gas may pass into the tube. In other embodiments, the first and second inlet openings may be formed directly in the tube itself such as, for example, in a side or end wall of the powder tube.

Preferably, a selectively operable control system is associated with the powder source for controlling one or more delivery parameters (e.g. rate of delivery, pressure, duration, etc) under which the cladding material and the carrier fluid are delivered to the inlet of the material feeder.

Preferably, the cladding material travels from the inlet of the material feeder to the tube and nozzle tip and subsequently to the component surface by gravity feed. Preferably, the inlet and the nozzle tip are connected via an open tube. In use, the fluid connection between the inlet and the tip is preferably substantially vertically. However, the connection may be in any orientation which allows gravity to act on the cladding material to move it from the inlet to the tip. The delivery of cladding material through the powder tube and nozzle to the component by gravity feeding advantageously results is a substantially uniform delivery in terms of rate of delivery and quantity as well as facilitating a more even distribution of particles throughout the delivered material. In other embodiments, the delivery of the cladding material to the component surface may be pressurised.

In some embodiments, a powder tube mounting bracket is provided to facilitate mounting of the powder tube. In certain embodiments, the powder tube mounting bracket includes a first plate adapted to be fastened to a desired mounting position or arm of a laser cladding system, the first plate having an opening for at least partially receiving a nose portion of the funnel. In some embodiments, the nose portion of the funnel may include a boss with an inwardly stepped distal end to facilitate locating of the nose portion into the opening of the first plate. Preferably, a grub or set screw can be fastened to the plate, through a threaded hole in the plate, to lock and hold the funnel in position against the plate. In use, the powder tube and powder injection nozzle are mounted so as to be coaxially aligned.

According to another aspect of the present invention, there is provided a nozzle assembly for delivering a cladding material into the vicinity of a laser beam projection, the nozzle assembly including:

a nozzle tip arranged to receive the cladding material and deliver/deposit the received cladding material into the vicinity of a laser beam projection and onto a surface of a component.

The nozzle assembly preferably includes a material feeder having an inlet for fluid communication with a source of cladding material and an outlet in fluid communication with the nozzle tip.

In certain embodiments, at least one of the position and orientation of the nozzle tip is adjustable with respect to the laser beam projection. Preferably, the nozzle tip is adjustable in at least two dimensions.

The material feeder is preferably defined by an elongate cylindrical tube. Preferably, the outlet of the material feeder is a funnel.

The cladding material is preferably delivered to the inlet of the material feeder as a cladding powder. Preferably, in a mixture with a carrier gas. The carrier gas is preferably nitrogen. Delivery of cladding powder to inlet of feeder is preferably pressurized.

Rate of delivery of cladding material is controlled prior to delivery to material feeder inlet. Material source and carrier source connected to material feeder, control at powder source how much powder and control at the carrier source how much carrier fluid is delivered to the inlet of the material feeder under pressure.

Preferably, the cladding material travels from the inlet of the material feeder to the nozzle tip and subsequently to the component surface by gravity feed. Preferably, the inlet and the nozzle tip are connected via an open tube. The fluid connection between the inlet and the tip is preferably substantially vertically. However, the connection may be in any orientation which allows gravity to act on the cladding material to move it from the inlet to the tip. Alternatively, the delivery of the cladding material to the component surface may be pressurised.

The nozzle assembly preferably includes fluid delivery means for the delivery of cooling fluid to the vicinity of the laser beam projection. The cooling fluid is preferably water. The delivery means is preferably in the form of a sleeve, tube or the like. Preferably, the sleeve is located coaxially with the nozzle tip.

The nozzle assembly preferably includes gas delivery means for the delivery of a gas shroud around the delivered cladding material. The gas delivery means is preferably in the form of a sleeve, tubes or the like. Preferably, the sleeve is located coaxially with the nozzle tip.

The nozzle tip is preferably replaceable. The nozzle tip is preferably slideable relative to the nozzle assembly to allow replacement of the nozzle tip. Preferably, the nozzle assembly includes a sleeve and the nozzle tip is slideable relative to the sleeve. Advantageously, this configuration allows the nozzle tip to be replaced without disrupting any supply lines within the nozzle assembly.

According to another aspect of the invention, there is provided a mounting assembly for a delivery nozzle of a laser cladding system, the mounting assembly including:

a connecting element for connecting the nozzle to or adjacent to a laser assembly of the laser cladding system; and an adjusting assembly including a first adjustment mechanism operatively connected to the nozzle and configured to enable selective movement of the nozzle relative to a laser beam projected by the laser assembly.

In some embodiments, the first adjustment mechanism is adapted to enable translational movement of the nozzle. Preferably, the movement is linear along a first axis. The first adjustment mechanism may be directly or indirectly connected to the nozzle.

In some embodiments, the first adjustment mechanism includes a housing adapted to be connected (e.g. by fasteners) to the connecting element. In certain embodiments, the housing is generally in the form of a rectangular prism. Preferably, the housing has a bore in which a first slide is movably located, the first slide being operatively connected to an actuator, wherein activation of the actuator causes a corresponding movement of the slide relative to the housing and thus a corresponding movement of the nozzle.

In some embodiments, the actuator is a threaded rod which is threadingly engaged with the first slide, whereby rotation of the rod causes a corresponding linear translational movement of the first slide. A knob is preferably connected to an end of the rod to facilitate manual operation of the first adjustment mechanism.

In some embodiments, the adjusting assembly includes a second adjustment mechanism operatively connected to the nozzle and configured to enable selective movement of the nozzle relative to a laser beam projected by the laser assembly.

In some embodiments, the second adjustment mechanism is adapted to enable translational movement of the nozzle in a direction transverse to the movement provided by the first adjustment mechanism. Preferably, the movement is linear along a second axis transverse to the first axis. The second adjustment mechanism may be directly or indirectly connected to the nozzle.

In some embodiments, the second adjustment mechanism includes a housing adapted to be connected (e.g. by fasteners) to the first slide of the first adjustment mechanism, preferably with the housing of the second adjustment mechanism arranged to extend transversely to the housing of the first adjustment mechanism. In certain embodiments, the housing is generally in the form of a rectangular prism.

Preferably, the housing of the second adjustment mechanism has a bore in which a second slide is movably located, the second slide being operatively connected to an actuator, wherein activation of the actuator causes a corresponding movement of the slide relative to the housing and thus a corresponding movement of the nozzle.

In some embodiments, the actuator of the second adjustment mechanism is a threaded rod which is threadingly engaged with the second slide, whereby rotation of the rod causes a corresponding linear translational movement of the slide. A knob is preferably connected to an end of the rod to facilitate manual operation of the second adjustment mechanism.

In some embodiments, the first adjustment mechanism is mounted to the connecting element, and the second adjustment mechanism is connected to the first slide of the first adjustment mechanism such that the second adjustment mechanism is carried by the first adjustment mechanism, whereby movement of the first slide causes a corresponding movement of the second adjustment mechanism.

In some embodiments, a connecting member or arm is connected to the second slide of the second adjustment mechanism, wherein the delivery nozzle is attached to the connecting member or arm, whereby movement of the first slide relative to the first housing causes a corresponding movement of the second adjustment mechanism, connecting arm and nozzle in a first direction, and movement of the second slide relative to the second housing causes a corresponding movement of the connecting arm and nozzle in a second direction transverse to the first direction. In some embodiments, the proximal end of the connecting arm is attached to the second slide and the nozzle is attached to or near a free distal end of the connecting arm. In certain embodiments, the powder injection nozzle is attached to the connecting arm via the nozzle mounting bracket, and the powder tube is attached to the connecting arm via the powder tube mounting bracket.

In some embodiments, the connecting element is a generally L-shaped element having a first web for mounting to or adjacent to the laser assembly, and a second web extending transversely from the first web and configured to enable the housing of the first adjustment mechanism to be fastened thereto.

In some embodiments, the connecting arm is configured such that the powder injection nozzle is arranged at a predetermined angle to the axis of the laser beam projected by the laser assembly, thereby to provide an off-axis delivery of the cladding material. In certain embodiments, the connecting arm may be bent or angled to provide the relative angle between the nozzle and laser beam. In some embodiments, the nozzle is mounted so as to deliver the cladding material at an angle in the range of 10-45 degrees relative to the axis of the laser beam, preferably 15-35 degrees and more preferably 20-30 degrees. In one preferred embodiment, the nozzle extends at an angle of approximately 20 degrees relative to the axis of the laser beam.

According to another aspect of the present invention, there is provided an adjusting assembly configured to adjust the orientation of an attached component. The adjustment is in at least two-dimensions. The component is preferably attached on the underside of the adjusting assembly. The topside of the adjusting assembly is preferably sealed to prevent ingress of dust, moisture, and/or particles. The attachment of the component is preferably sealed. A sealing ring may be used.

Preferably, the adjusting assembly is suitable for adjusting a position of a cladding nozzle relative to a laser beam. In certain embodiments, at least one of the position and orientation of the nozzle tip is adjustable with respect to the laser beam projection.

Preferably, the cladding nozzle is adjustable in two dimensions relative to the laser beam projection. This advantageously allows the uniform coating of irregular and complex components, such as spherical surfaces, by enabling control of the position and orientation of the laser and deposited material, and the speed of coating as the component rotates.

According to another aspect of the present invention, there is provided a laser cladding assembly including:
a delivery nozzle as described herein for delivering a cladding material towards a surface of a component;
a laser assembly for projecting a laser beam towards the surface of the component;
wherein the nozzle is arranged such that the cladding material delivered by the nozzle will intersect the laser beam.

Preferably, the cladding material intersects the laser beam at a predetermined position relative to the focal point of the laser beam.

Preferably, the cladding assembly is adjustably connected to the laser assembly by an adjuster assembly which is configured to adjust the nozzle assembly in two-dimensions relative to the laser beam projection.

In some embodiments, an axis of the nozzle is oriented vertically and an axis of the laser assembly is oriented at an angle thereto, in use. In certain embodiments, the angle is approximately 20 degrees. Alternatively, the axis of the laser assembly may be oriented vertically and the axis of the nozzle assembly oriented at an angle respective thereto.

Preferably, the laser cladding assembly further includes an articulated robotic arm incorporating a support assembly for the laser assembly, whereby the robotic arm is adapted to support the laser assembly and delivery nozzle as an end-effector of the arm or at an intermediate position along the arm.

The robotic arm preferably includes a base and a plurality of links connected in series by a corresponding plurality of revolute joints, the links and joints thereby forming a kinematic chain terminating with the laser assembly and nozzle as the end-effector. Each of the revolute joints preferably incorporates an actuator, ideally in the form of an independently operable electric servo motor. In some embodiments, the first and second adjustment mechanisms provide additional degrees of freedom in the kinematic chain, and additional operating range and/or fine adjustment for the robotic arm.

In some preferred embodiments, the robotic arm incorporates multiple redundant degrees of freedom, thereby to provide additional flexibility in terms of the spatial location, orientation and intended path of the laser assembly and nozzle during a cladding operation.

Preferably, the laser cladding assembly includes a stand on which the laser assembly is mounted. In some embodiments, the stand is slidably mounted to a second rail or bed such that the laser assembly and delivery nozzle can traverse the second rail in use to position the laser and nozzle relative to the workpiece or component, as required. The second rail is preferably arranged in parallel spaced apart relation relative to the headstock and tailstock rail. Movement of the stand along the second rail may be by manual operation (e.g. pushed or pulled) or partly or fully automated by a suitable drive system, the control of which is undertaken as part of an overall control methodology.

BRIEF DESCRIPTION OF THE DRAWINGS

Preferred embodiments of the invention will now be described, by way of example only, with reference to the accompanying drawings in which:

FIGS. 2A-2C show an embodiment of a machine base in the form of a tailstock with a locking mechanism according to an aspect of the present invention;

FIGS. 5A-5D show a top view, a side view, a distal end view and a proximal end view of an embodiment of a powder injection nozzle, respectively, according to the present invention;

FIGS. 6A-6C shows an exploded view of an embodiment of an exploded sectional side view of a material feeder, a partial section end view of an inlet end of the material feeder, and a powder tube mounting bracket, respectively, according to the present invention;

FIGS. 7A-7B show a front and side view of an embodiment of an adjustable mounting assembly according to the present invention, respectively; and FIGS. 8A-8C show a sectional side view, a top view and an end view of a slide of an adjustment mechanism, respectively according to the present invention; and FIGS. 8D-8E show a threaded rod and knob for engaging the slide.

PREFERRED EMBODIMENT OF THE INVENTION

Figure 1:
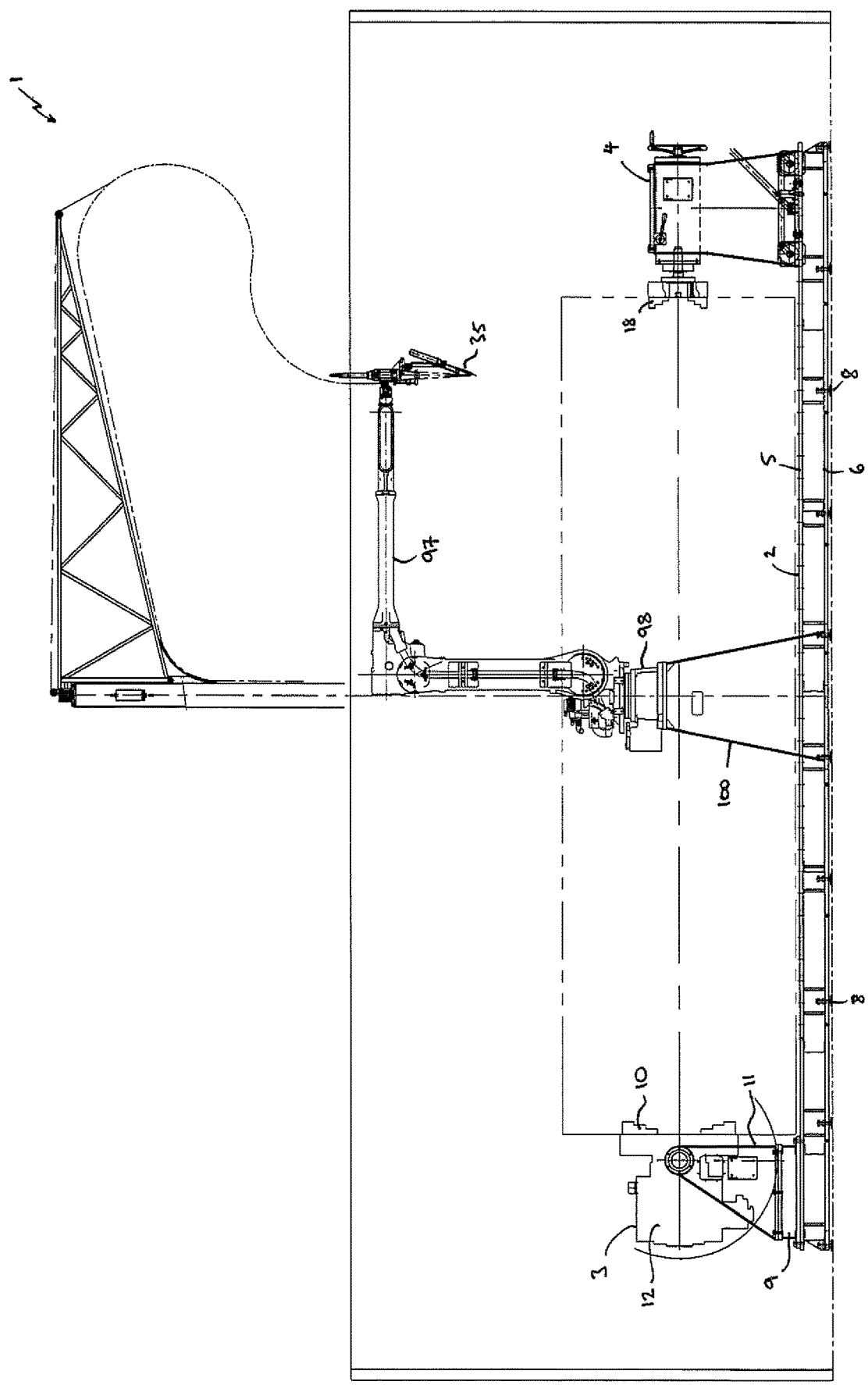
FIG. 1 is a schematic representation of an embodiment of a laser cladding system according to the present invention.
Figure 3:
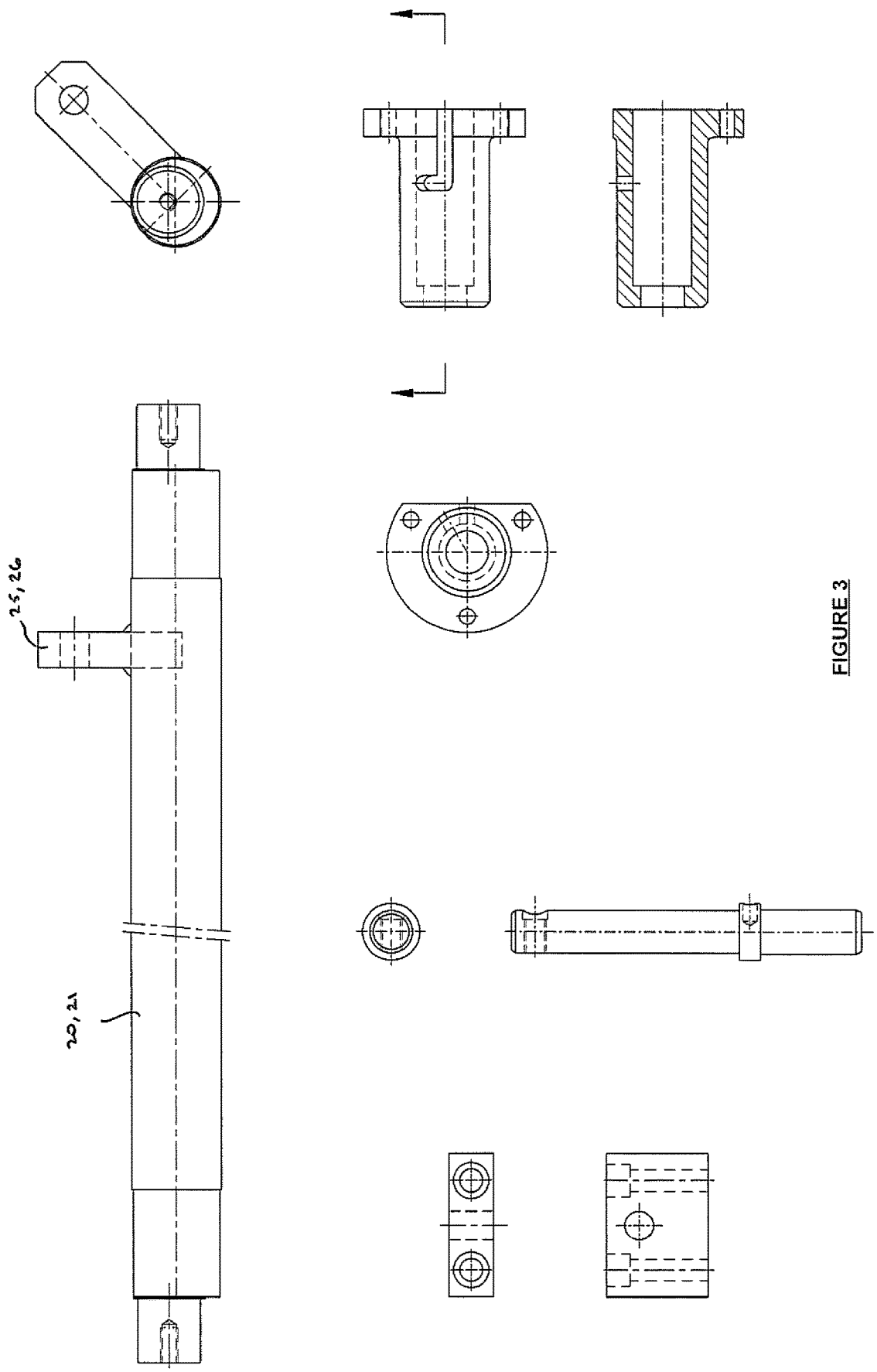
FIG. 3 shows various details of a shaft of the locking mechanism of FIG. 2 with eccentric end portions.

Referring to the drawings and initially to FIG. 1, the invention provides a laser cladding system 1 including a machine bed or rail 2. A workpiece positioning system in the form of a headstock assembly 3 is securely fastened adjacent one end of the rail 2. A machine base in the form of a tailstock assembly 4 is slidably mounted to the other end of the rail 2 and in spaced apart relation relative to the headstock assembly 3 such that a workpiece (not shown) can be supported between the headstock assembly 3 and the tailstock assembly 4.

The rail 2 has an upper rail plate 5 with a planer surface on which the headstock assembly and tailstock assemblies (3, 4) are seated. The rail 2 includes a base plate 6 extending in parallel spaced apart relation underneath the upper rail plate 5. The upper rail plate 5 and base plate 6 are held apart by a pair of side edge members 7 extending longitudinally along and adjacent to respective sides of the plates (5, 6).

Each side edge member 7 is preferably formed by an elongate metal channel and arranged inwardly of the associated edges of the upper rail plate to define a protruding lip or catch to which a complementary engaging potion of the tailstock assembly is engagable.

A plurality of support elements in the form of adjustable feet 8 are arranged about the periphery of the rail 2. Each foot 8 has a ground engaging portion and is adjustable in height to facilitate levelling of the upper rail plate 5.

The headstock assembly 3 is fixedly mounted to the rail 2 by a plurality of threaded bolts that threadingly engaging the rail such that a distance between the headstock 3 and tailstock 4 assemblies is set by selective movement of the tailstock assembly 4 along the rail 2 (i.e. towards or away from the headstock assembly).

As shown in FIG. 1, the headstock assembly 3 has a base 9 for bearing against the rail 2 and a carrier in the form of a chuck 10 mounted to the base 9 and adapted to support the workpiece, in use.

The headstock assembly 3 has a support structure in the form of a pair of spaced apart posts 11 extending upwardly from the base 9 for supporting the chuck 10 therebetween at a predetermined height above the rail 2.

The headstock assembly 3 is adapted to move the workpiece about two axes, with the chuck configured for rotation about a first axis ('X-axis or axis of rotation') and tilting movement about a second axis ('Z- or tilt axis') orthogonal to the first axis ('X').

To facilitate the movement of the chuck 10, the headstock assembly 3 includes a first drive means for rotating the chuck 10 about the first axis (X'). The first drive means is controllable to rotate the chuck 10 at a desired rotational speed (i.e. rpm) through continuous 360 degree revolutions, optionally clockwise or counter-clockwise about the first axis. The first drive means preferably includes an electric motor with a reduction gearbox (not shown). The first drive means is preferably configured to enable rotation of the chuck at rotational speeds of up to 50 rpm (approximately 5 $rad.s^{-1}$). The headstock assembly 3 includes a drive housing 12 for housing the first drive means, whereby the chuck 10 and drive housing 12 move together and tilt about the second or tilt axis.

The headstock assembly 3 includes a second drive means, including an electric motor and reduction gearbox (not shown), for tilting the chuck 10 about its tilt axis ('Z'). The second drive means is arranged in a second drive housing (not shown) and configured to enable the chuck 10 to be tilted about its tilt axis through a range of 0 to 90 degrees relative to the longitudinal axis of the rail, as desired. In use, the second drive means can hold the chuck 10 at a desired (fixed) tilt angle, thereby to enable the first drive means to rotate the chuck about its axis of rotation whilst tilted. It will be appreciated that, when the chuck 10 is tilted, the axis of rotation is tilted and at an angle relative to the rail. The ability to tilt and hold the chuck at a desired tilt angle is particularly advantageous for laser cladding components having irregular or complex surface profiles.

The chuck 10 may be releasably mountable to the headstock assembly 3. Depending the sixe and configuration of the workpiece and/or the parameters of the cladding process, the chuck 10 mounted to the headstock assembly may be a three-jaw chuck or a four-jaw chuck.

Advantageously, the headstock assembly 3 can be configured to have capacity for relatively light and/or heavy duty operation and for handling a range of workpiece sizes. By way of example, the headstock assembly 3 may be adapted to handle workpieces having (a) a weight of up to 10,000 kg or more, (b) a length of up to 5 m or more, and/or (c) a diameter of up to 1,000 mm or more.

Referring to FIGS. 2A-2C, the tailstock assembly 4 includes a locking mechanism 15 selectively and manually operable between a locking position in which the tailstock assembly is lockable against the rail 2 in a desired position relative to the headstock, and an unlocked position in which the tailstock 4 assembly is adapted to freely traverse the rail 2.

The tailstock assembly 3 has a base 16 with a base surface adapted to bear against the upper rail surface 5 of the rail 2 when the locking mechanism 15 is in the locking position.

The tailstock assembly 3 has a support structure 17 extending upwardly from the base 16. The support structure 17 is configured to hold a centring unit in the form of a tail chuck 18 (e.g. 3- or 4-jaw chuck) in coaxial alignment with the chuck 10 of the headstock assembly 3. It will be appreciated that the reference to coaxial alignment between the chuck 10 and tail chuck 18 refers to the configuration when the carrier/chuck is at 0 degree tilt angle relative to the rail 2 and the axis of rotation ('X') is parallel with the longitudinal axis of the rail 2. In use, the tail chuck 18 assists to support the distal end of the component or workpiece (i.e. the other end of the workpiece to that supported by the chuck of the headstock assembly).

The base 16 of the tailstock assembly 4 includes a friction reducing element in the form of a set of four wheels 19. The wheels 19 are operatively associated with the locking mechanism 15. When the locking mechanism 15 is in the unlocked position, the wheels 19 can bear against (in engaging contact) the rail 2 to allow rolling movement of the tailstock assembly 4 relative to the rail 2 towards and away from the headstock assembly 3, as required.

The set of wheels 19 include two front wheels mounted to a front shaft 20 and two rear wheels mounted to a rear shaft 21. The ends of the front and rear shafts (20, 21) are configured such that the front and rear wheels are eccentrically mounted to the respective shafts, with the centre of each wheel offset from the axis of rotation of the respective shaft. This eccentric mounting of the wheels on the shaft facilitates the movement of the wheels into and out of contact with the rail 2 upon rotation of the shaft.

The locking mechanism 15 includes a selectively operable lever 22 arranged and configured to simultaneously rotate the front and rear shafts (20, 21) and thereby move the wheels 19 relative to the rail 2. When the lever 22 is in a first position corresponding to the locked position, the wheels 19 are moved out of contact with the rail 2 and the base 16 bears against the rail 2. When the lever 22 is in a second position corresponding to the locking position, the wheels 19 are moved into contact with the rail 2 to enable movement of the base 16 and thus the tailstock assembly 4 relative to the rail 2.

As most clearly seen in FIG. 2B, the lever 22 of the locking mechanism 15 is pivotally mounted at its proximal end to the base 16 and operatively connected to the wheels 19 via one or more linkage arms 23. A first linkage arm 23 has one end connected to the lever 22 near or adjacent the pivot point 24 and another end connected to the front shaft 20 via a lug 25 fixedly attached to the front shaft 20. A second linkage arm 23 has one end connected to the lever 22 near or adjacent to the pivot point 24 and another end connected to the rear shaft 21 via a lug 26 fixedly attached to the rear shaft 21. By this lever and linkage arrangement, movement of the lever 22 about its pivot point 24 causes a corresponding and simultaneous rotation of the front and rear shafts (20, 21) and the associated wheels 19.

Referring to FIG. 2C, the front and rear shafts (20, 21) are fixedly secured to the base 16 via shaft mounting blocks 27 (i.e. respective left and right blocks), with each shaft passing through respective holes formed in each block 27 and the respective ends of the shafts protruding from the blocks such that the wheels 19 are mounted outwardly of the shaft mounting blocks 27. As most clearly seen in FIG. 2A, a cover member 28 is arranged over each wheel 19. Each cover member 28 has a cavity for at least partially receiving the associated wheel 19. Each cover member 28 is mountable to the respective shaft mounting block 27 at one point and engagable with the rail 2 at another point, thereby to enable the base of the tailstock to (slidably and upwardly) move relative to the rail 2 upon rotation of the eccentrically mounted wheels 19 via operation of the lever 22.

An operatively upper end 29 of each cover 28 has two openings for receiving a pair of corresponding guide pins 30 extending upwardly from the respective shaft mounting block 27 such that the upper end 29 is vertically spaced from the top of the mounting block 27 to enable the base 16 of the tailstock 4 to move upwardly relative to the rail 2 upon rotation of the eccentrically mounted wheels.

The base 16 of the tailstock assembly 4 and the rail 2 include complementary connectors for locking the base relative to the rail. These connectors are in the form of spring loaded locking pins 32 associated with the base 16 and corresponding receiving formations in the form of holes 33 in the rail 2. The rail 2 preferably has a linear array of holes 33 formed along one or both side edges of the rail 2 such that upon sliding movement of the base 16 of the tailstock 4 along the rail, the pin will align with a hole at which point the spring force will propel the pin into the underlying hole 33. The pin 32 may be held against the action of the spring to allow movement of the tailstock 4 further along the rail 2, depending on the spacing required between the headstock and tailstock assemblies (3, 4).

Advantageously, the lever 22 of the locking mechanism 15 is able to be manually released and the base 4 moved by a single operator. This configuration is particularly advantageous in situations where it is desirable that no lubricant is used on the rail or machine bed on which the base is positioned. This may occur, for example in laser cladding, where debris such as metal powder falls on the rail or bed during operation and needs to be swept off.

Referring to FIGS. 5A-5D, the laser cladding system 1 includes a powder injection nozzle 35 for delivering a cladding (powder) material towards a surface of the workpiece. The nozzle 35 includes an elongate hollow cylindrical body 36 and an elongate hollow cylindrical tube 37 coaxially and releasably arranged to extend through the body 36. In the illustrated embodiment and as clearly seen in FIGS. 5A-5B, the tube 37 is longer, and has a smaller diameter, compared to that of the body 36. The tube 37 has a constant cross-sectional diameter and defines a through passage with an inlet 38 for receiving the cladding material and an outlet 39 for delivering the cladding material.

Referring to FIG. 5B, the body 36 has a gas inlet tube 40 for receiving a shielding gas and an outlet 41 for ejecting the gas from the body, thereby to form in use a gas shield about the cladding material as it is delivered from the body 36.

The gas inlet tube 40 has a first free open 42 for connection to a gas supply line (not shown and second fixed end 43 fixed about a hole formed in a wall of the body 36, thereby to provide a passageway for the shielding gas from the first free end 42 to the interior of the body 36. In the illustrated exemplary embodiment, the gas inlet tube 40 includes a first portion defining the first free end and extending parallel to the longitudinal axis of the body and a second portion extending at an angle of approximately 30 degrees relative to the first portion.

The (gas) outlet 41 of the body 36 is formed by a ring insert 44 arranged at the distal end of the body 36 and between the body 36 and the central tube 37. In the illustrated embodiment, the ring insert 44 has a polar array of eight holes 45 arranged about the tube 37 such that the gas can be delivered from the body and form a shield about cladding material as it exits the tube 37. The tube 37 passes through a central opening formed in the insert 44, preferably by way of an interference fit or size-for-size fit. It will be appreciated that the number, size and arrangement of the holes may vary to suit a particular application and is not limited to the exemplary arranged shown in the drawings.

Again referring to FIGS. 5A-5B, a closure member in the form of a collar 46 is sealingly arranged at the proximal end of the body 36 and between the body 36 and the tube 37 to prevent gas from escaping via the distal end of the body 36. The tube 37 passes through an opening formed in the collar 46, preferably by way of an interference fit or size-for-size fit.

The interference or size-for-size fit between the tube 37 and the ring insert 44 and collar 46 advantageously provides and facilitates the releasable connection of the tube 37, allowing the tube 37 to be readily and efficiently removed and replaced as required.

The tube 37 is fitted within the body 36 such that the outlet 39 projects from the distal end of the body 36, thereby to provide a nozzle tip 47. In the illustrated embodiment, the nozzle tip 47 projects approximately 5 mm forward of the distal end of the body 36. The inlet 38 of the tube 37 projects approximately 30-45 mm rearwardly of the distal end of the body 36 to facilitate connection to a material feeder as described below.

The powder injection nozzle 35 includes an integrally formed fluid delivery unit 50 for delivering a cooling fluid to the distal end region of the powder injection nozzle 35. In the illustrated embodiment, the fluid delivery unit is in the form of a water cooling mechanism 50 adapted to control and cool the temperature of the distal end of the tube 37, nozzle tip 47 and body 36, in use. The water cooling mechanism 50 is particularly advantageous in laser cladding applications in which the nozzle tip 47 is required to be located in very close proximity to a laser beam and thus subject to extreme temperatures which can result in premature failure or reduced working life of the powder injection nozzle 35, particularly the nozzle tip 47.

Referring to FIGS. 5A-5B, the water cooling mechanism 50 includes a sleeve 51 fixed to and bounding the distal end portion of the body 36, forming an enclosed area between an inner surface of the sleeve 51 and an outer surface or wall of the body 36. The length of the sleeve 51 is less than the length of the body 36. The sleeve 51 is preferably coaxially aligned with the body 36 such that a cross-sectional profile of the enclosed area is in the form of an annulus or ring.

The sleeve 51 of the water cooling mechanism 50 includes an inlet hole 52 formed in the wall of the sleeve and through which water can be charged into the enclosed area between the sleeve and the body and circulated about the enclosed area, and a second outlet hole formed in the wall of the sleeve through which water can be discharged from the sleeve, thereby to cool the associated regions of the body, tube and nozzle tip in use.

The water cooling mechanism 50 includes a water inlet pipe 52 having a first free open end 53 for connection (via a hose or other suitable duct) to a water supply line (not shown) and second fixed end 54 fixed about an inlet hole 55 formed in the wall of the sleeve 51, thereby to provide a passageway for water to be charged to the enclosed area. In the illustrated embodiment, the water inlet pipe 52 includes a first portion defining the first free end and extending parallel to the longitudinal axis of the body and a second portion extending at an angle of approximately 30 degrees relative to the first portion.

The water cooling mechanism 51 includes a water outlet pipe 56 having a first free open end 57 for connection (via a hose or other suitable duct) to a water waste or recycling station and second fixed end 58 fixed about an outlet hole 59 formed in the wall of the sleeve 51, thereby to provide a passageway for water to be discharged from the enclosed area.

As most clearly seen in FIG. 5A, a nozzle mounting bracket 60 is provided to facilitate mounting of the powder injection nozzle 35 to a laser cladding assembly as described further below. In the illustrated embodiment, the nozzle mounting bracket 60 is securely fixed connected to the body 36 so as to be positioned towards the proximal end of the body. The nozzle mounting bracket 60 has one or more receiving formations in the form of threaded holes for accommodating complementary fasteners to mount the nozzle in a predetermined desired position, in use.

The body, the tube, the insert, the closure member, the gas inlet pipe, the water inlet and outlet pipes, and the nozzle mounting bracket are preferably formed of copper, with suitable copper welding a material between the respective parts.

Figure 4B:
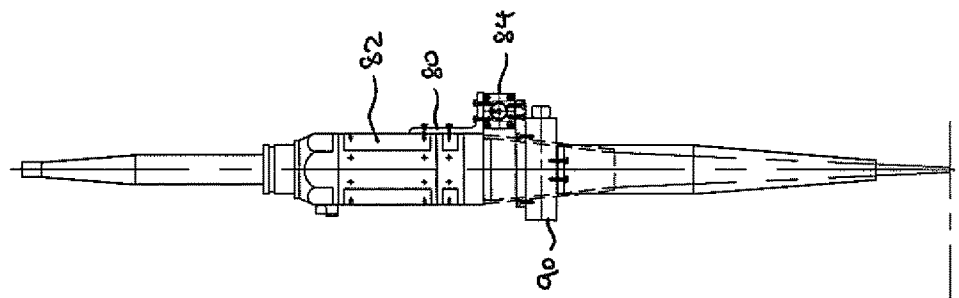
FIGS. 4A-4B show a side view and an end view of a laser cladding assembly of the laser cladding system of FIG. 1.
Figure 4A:
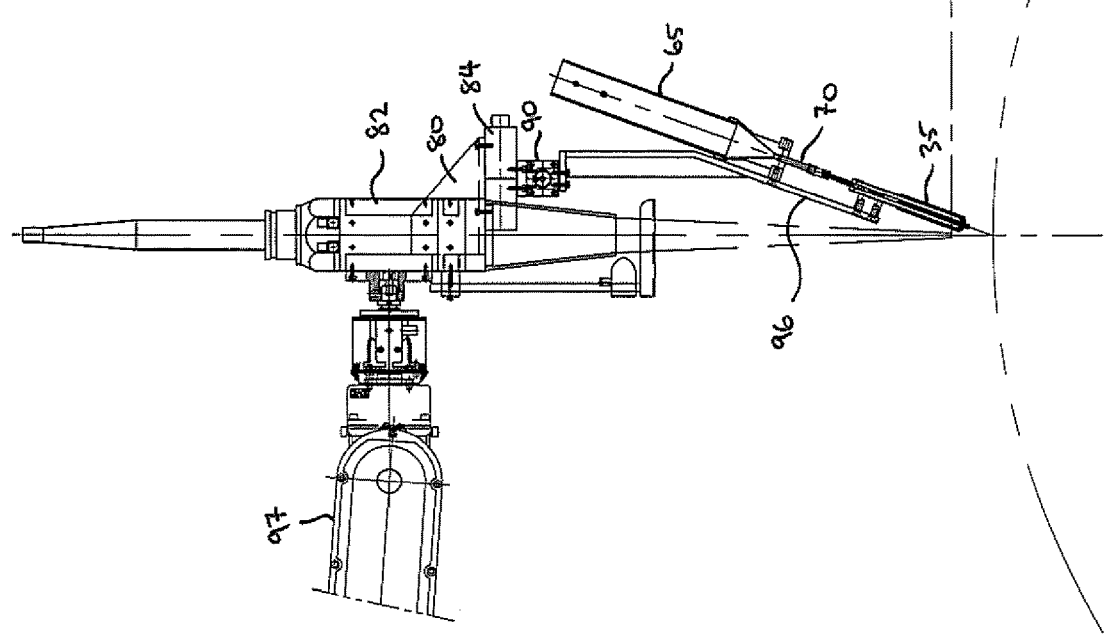

As foreshadowed and as best seen in FIG. 4A, the inlet 38 of the tube 37 of the powder injection nozzle 35 is configured to be operatively connected to an outlet of a material feeder 65 adapted to deliver the cladding material to the tube 37.

Referring to FIGS. 6A-6C, the material feeder 65 includes a powder tube 66 with an inlet for fluid communication with a source or reservoir of the cladding material and an outlet in fluid communication with the inlet of the tube 37 of the nozzle 35.

The powder tube 66 is an elongate hollow cylindrical tube of constant cross-sectional diameter. The distal end of the powder tube 66 has a funnel 67 mounted thereto, the funnel defining the outlet of the material feeder 65. The inlet of the funnel 67 is sleevingly received over the outlet of the powder tube 66 and the funnel 67 tapers inwardly from its inlet 68 such that the inlet is wider than its outlet 69. The funnel 67 therefore has narrowed passageway which defines the outlet 69 through which the cladding material exits and passes to the tube 37 of the nozzle 35.

The outlet 69 of the material feeder 65 is connected to the inlet 38 of the tube 37 of the nozzle 37 via a connecting mechanism such as for example a powder connection hose with associated connectors (e.g. quick release hose connectors) 70, as shown in FIG. 4A.

The cladding material is preferably delivered to the inlet of the material feeder 65 as a cladding powder, preferably in a mixture with a pressurised carrier gas such as nitrogen. The rate of delivery of the cladding material is controlled prior to delivery to the material feeder 65, with the material source and carrier gas source each connected to the material feeder via a dedicated material source supply line and a dedicated carrier gas supply line, respectively. In the illustrated embodiment, the powder tube 65 has a first inlet opening 71 for connection with the material source line through which the cladding material may pass into the tube 65, and a second inlet opening 72 for connection with the carrier gas source line through which the carrier gas may pass into the tube 65. The first and second inlet openings (71, 72) are formed a wall of the powder tube 65.

A selectively operable control system (not shown) is associated with the powder source for controlling one or more delivery parameters (e.g. rate of delivery, pressure, duration, etc) under which the cladding material and the carrier fluid are delivered to the inlet of the material feeder 65.

Once the cladding material reaches the material feeder it is depressurised to allow the cladding material to travel from the inlet of the material feeder to the tube 37 and nozzle tip 47, and subsequently to the component surface, under a gravity feeding process. The delivery of cladding material through the powder tube and nozzle to the component by gravity feeding advantageously results is a substantially uniform delivery in terms of rate of delivery and quantity as well as facilitating a more even distribution of particles throughout the delivered material in the clad surface.

Referring to FIG. 6C, a powder tube mounting bracket 73 is provided to facilitate mounting of the powder tube 65 to the laser cladding assembly. The powder tube mounting bracket 73 includes a square or rectangular plate adapted to be fastened to a desired mounting position or arm of the laser cladding system. The first plate has an opening 74 for at least partially receiving a nose portion 75 of the funnel 67. As seen in FIG. 6A, the nose portion 75 of the funnel 67 includes a boss 76 with an inwardly stepped distal end 77 to facilitate locating of the nose portion into the opening 74 of the first plate. The plate includes a threaded bore 78 in which a grub screw (not shown) can be threadingly engaged to lock and hold the funnel 67 in position against the plate 73.

Referring to FIGS. 4, 7-8, there is illustrated a mounting assembly 79 to facilitate mounting of the powder injection nozzle 35 and material feeder 65. The mounting assembly includes a connecting element in the form of a generally L-shaped angle bracket 80. The bracket 80 has a first web 81 adapted to be secured to a laser assembly 82 (see FIG. 4A), and a second web 83 extending transversely from the first web 81 and configured to enable an adjusting assembly to be fastened thereto.

The adjusting assembly includes a first adjustment mechanism 84 adapted to enable linear translational movement of the nozzle along a first axis. The first adjustment mechanism includes a rectangular prism shaped housing 85 connected by fasteners to the second web 83 of the bracket 80. The housing 80 has an internal bore or cavity 86 in which a first slide 87 is slidably arranged. The first slide 87 is operatively connected to an actuator in the formed of a threaded rod 88. The threaded rod 88 is threadingly engaged with the first slide 87 such that rotation of the rod 88 causes a corresponding linear translational movement of the first slide 87 relative to the housing 80 and thus a corresponding movement of the nozzle 35.

A knob 89 is connected to an end of the rod 88 to facilitate manual operation of the first adjustment mechanism 84 (e.g. by hand rotation of the knob 89 in a clockwise or counter-clockwise direction).

The adjusting assembly includes a second adjustment mechanism 90 operatively connected to the nozzle 35 and configured to enable selective movement of the nozzle relative to a laser beam projected by the laser assembly 82. The second adjustment mechanism 90 is adapted to enable linear translational movement of the nozzle 35 along a second axis extending transversely to the first axis (provided by the first adjustment mechanism 84).

The second adjustment mechanism 90 includes a rectangular prism shaped housing 91 connected via a joining plate and fasteners to the first slide 87 of the first adjustment mechanism 84 such that the housing 91 of the second adjustment mechanism 90 is arranged to extend transversely to the housing 85 of the first adjustment mechanism 84. The housing 91 has an internal bore or cavity 92 in which a second slide 93 is slidably arranged. The second slide 93 is operatively connected to an actuator in the form of a threaded rod 94. The threaded rod 94 is threadingly engaged with the second slide such that rotation of the rod 94 causes a corresponding linear translational movement of the second slide 93 relative to the housing 91 and thus a corresponding movement of the nozzle 35.

A knob 95 is connected to an end of the rod 94 to facilitate manual operation of the second adjustment mechanism 90 (e.g. by hand rotation of the knob 95 in a clockwise or counter-clockwise direction).

As most clearly seen in FIG. 4A, a connecting arm 96 is connected to the second slide 93 of the second adjustment mechanism 90. The connecting arm 96 is adapted to carry the nozzle 35 and material feeder 65. The nozzle 35 is attached to the connecting arm 96 via the nozzle mounting bracket 60, and the material feeder 65 is attached to the connecting arm 96 via the powder tube mounting bracket 73.

By way of this arrangement, movement of the first slide 87 relative to the first housing 85 causes a corresponding movement of the second adjustment mechanism 90, connecting arm 96 and nozzle 35 in a first direction to allow positioning of the nozzle relative to the laser beam along a first axis. Similarly, movement of the second slide 93 relative to the second housing 91 causes a corresponding movement of the connecting arm 96 and nozzle 35 in a second direction transverse to the first direction to allowing positioning of the nozzle 35 relative to the laser beam along a second axis.

The connecting arm 96 is configured such that the powder injection nozzle 35 is arranged at a predetermined angle to the axis of the laser beam projected by the laser assembly 82, thereby to provide an off-axis delivery of the cladding material. In the illustrated embodiment, the connecting arm 96 is bent to provide the desired relative angle between the nozzle and laser beam. Here the nozzle extends at an angle of approximately 20 degrees relative to the axis of the laser beam. Ideally, the cladding material intersects the laser beam at a predetermined position (above) relative to the focal point of the laser beam.

Referring to FIG. 1, the laser cladding assembly includes an articulated robotic arm 97 with 6-degrees of freedom incorporating a support assembly for the laser assembly 82, whereby the robotic arm 97 is adapted to support the laser assembly 82 and nozzle 35/material feeder 65 as an end-effector of the arm or at an intermediate position along the arm.

The robotic arm 97 includes a base 98 and a plurality of links 99 connected in series by a corresponding plurality of revolute joints, the links and joints thereby forming a kinematic chain terminating with the laser assembly and nozzle as the end-effector. Each of the revolute joints preferably incorporates an actuator, ideally in the form of an independently operable electric servo motor. The first and second adjustment mechanisms (84, 90) provide additional degrees of freedom in the kinematic chain, and additional operating range and/or fine adjustment for the robotic arm 97.

The robotic arm 97 is mounted via its base 98 to a stand 100 which is slidably mounted to a second rail or bed (not shown) such that the robotic arm 97, laser assembly 82 and nozzle 35 can traverse the second rail in use to position the laser and nozzle relative to the workpiece or component, as required. The second rail is preferably arranged in parallel spaced apart relation relative to the rail 2 on which the headstock and tailstock assemblies (3, 4) are mounted. Linear sliding movement of the stand 100 along the second rail may be achieved by manual operation (e.g. pushed or pulled) or partly or fully automated by a suitable drive system, the control of which is undertaken as part of an overall control methodology for the laser cladding system.

The invention in its various aspects and especially in its preferred embodiments provides a number of inherent and unique advantages. The invention was developed in part to improve the adaptability of a laser cladding system to be set up, customised and operated for use with workpieces of various and irregular shapes and sizes and, in various preferred embodiments, provides one or more of the following advantages in that context: a workpiece positioner with capacity to handle a wide range of workpieces from very small components to large jobs in excess of 10,000 kg, >5 m length, and/or >1000 mm diameter, continuous infinite rotation of a workpiece about one axis at speeds of up to 50 rpm (approx. 5 rad.s$^{-1}$), rapid manual repositioning of the tailstock by one worker to accommodate jobs of different lengths, a rail or machine bed adapted to facilitate the positioning of the tailstock whilst being resistant to metal and ceramic powders and allowing such debris to be disposed, recovered or recycled.

The laser cladding system is advantageously adapted to withstand high working temperatures and related heat transfer during the cladding process. The ability to withstand such high working temperatures, in certain embodiments, is aided by the advantageous use of relatively large oil circulation gearboxes in the headstock, and relatively large radial and thrust bearings internal to both the headstock and tailstock.

Preferred embodiments of the invention also advantageously provide a water cooled off-axis powder injection nozzle incorporating a rapidly replaceable powder injection tube. The ability to water cool the nozzle advantageously reduces the likelihood of melting of the tip of the nozzle tube, or at least extends its working life, by acting against direct or reflected laser energy, in use. It is particularly advantageous feature of the present invention that the nozzle tube can be readily and efficiently accessed and replaced, with advantages in terms of reduce downtime and labour costs.

Preferred forms of the invention also advantageously provide a gravity fed powder injection nozzle by depressurising the powder transport system upstream of the nozzle, with related improvements in terms of accuracy and uniformity of delivery of the cladding powder material. The invention in its preferred forms also provides a simple, robust and accurate mechanism for adjusting the position of the powder injection nozzle with respect to the laser beam, as well as being largely resistant to cladding powder infiltration and heat.

Based on a substantially improved locking mechanism, the invention also provides a machine base which in certain embodiments is readily operable by a single operator and adaptable for use in applications and machinery outside of laser cladding.

In these and other respects, the invention represents a practical and commercially significant improvement over the prior art. Although the invention has been described with reference to specific examples, it will be appreciated by those skilled in the art that the invention may be embodied in many other forms. It should also be understood that the various aspects and embodiments of the invention as described can be implemented either independently, or in conjunction with all viable permutations and combinations of other aspects and embodiments. All such permutations and combinations should be regarded as having been herein disclosed.

The invention claimed is:

1. A powder injection nozzle for a laser cladding system, including:
   an elongate hollow cylindrical body, the body having a proximal end, a distal end, and a gas inlet;
   an elongate hollow cylindrical tube,
      wherein the tube has a constant cross-sectional outer diameter along a length of the tube, and
      wherein a length of the body is less than the length of the tube;
   a plug insert arranged at the distal end of the body, the plug insert being releasably arranged between the body and the tube, wherein the plug insert has one or more openings which define a gas outlet through which a gas can be delivered from the body; and
   a closure member sealingly arranged at the proximal end of the body, the closure member being releasably arranged between the body and the tube so as to prevent gas from escaping via the proximal end of the body;
   wherein the plug insert has a central opening and the closure member has a central opening, and wherein the tube is configured to pass through the central opening of the plug insert and the central opening of the closure member such that the tube has an interference fit, or a size-for-size fit, with the plug insert and the closure member, thereby to provide a releasable sliding connection between the tube and both the plug insert and the closure member, wherein the tube can be fitted or removed from the central openings of both the plug insert and the closure member via the sliding connection;

wherein the tube defines a through passage having an inlet for receiving a cladding material and a nozzle tip defining an outlet of the tube for delivering the cladding material from the tube;

wherein the tube is fitted within the body, via the interference fit or the size-for-size fit with the plug insert and the closure member, such that a distal end of the tube projects forward of the distal end of the body to define the nozzle tip;

wherein the tube is fitted within the body, via the interference fit or the size-for-size fit with the plug insert and the closure member, such that a proximal end of the tube extends rearwardly of the body, wherein the extent to which the nozzle tip projects forward of the distal end of the body is less than the extent to which the proximal end of the tube extends rearwardly of the body; and wherein the body, the tube, the plug insert and the closure member are all formed of the same material.

2. The powder injection nozzle according to claim 1, wherein the gas inlet includes a gas inlet tube having a first free open end for connection to a gas supply line and a second fixed end extending through a hole formed in a wall of the body, thereby to provide a passageway for the gas from the first free open end to an interior of the body.

3. The powder injection nozzle according to claim 2, wherein the gas inlet tube includes a first portion defining the first free open end and extending parallel to the longitudinal axis of the body and a second portion extending at an angle to the first portion.

4. The powder injection nozzle according to claim 1, wherein the plug insert includes two or more openings arranged to form a polar array of openings about the tube.

5. The powder injection nozzle according to claim 1, wherein the powder injection nozzle includes a fluid delivery unit for delivering a cooling fluid to the distal end region of the powder injection nozzle.

6. The powder injection nozzle according to claim 5, wherein the fluid delivery unit is in the form of a water cooling mechanism adapted to cool the temperature of the distal end of the tube.

7. The powder injection nozzle according to claim 6, wherein the water cooling mechanism includes a sleeve fixed to and bounding at least a portion of the body, thereby to form an enclosed area between an inner surface of the sleeve and an outer surface or wall of the body.

8. The powder injection nozzle according to claim 7, wherein the sleeve is coaxially aligned with the body, the sleeve being arranged to bound a portion of the body at or adjacent to the distal end of the body.

9. The powder injection nozzle according to claim 7, wherein the sleeve of the water cooling mechanism includes at least a first inlet hole formed in the wall of the sleeve and through which water can be charged into the enclosed area between the sleeve and the body and circulated about the enclosed area, and a second outlet hole formed in the wall of the sleeve through which water can be discharged from the sleeve, thereby to cool the associated regions of the body, tube and nozzle tip in use.

10. The powder injection nozzle according to claim 9, wherein the water cooling mechanism includes a water inlet pipe having a first free open end for connection to a water supply line and second fixed end fixed in the first inlet hole formed in the wall of the sleeve, thereby to provide a passageway for water to be charged to the enclosed area.

11. The powder injection nozzle according to claim 9, wherein the water cooling mechanism includes a water outlet pipe having a first free open end for connection to a water waste or recycling station and second fixed end fixed in the second outlet hole formed in the wall of the sleeve, thereby to provide a passageway for water to be discharged from the enclosed area.

12. The powder injection nozzle according to claim 1, wherein the inlet of the tube of the powder injection nozzle is configured to be operatively connected to an outlet of a material feeder adapted to deliver the cladding material to the tube.

13. The powder injection nozzle according to claim 12, wherein the material feeder includes a powder tube with an inlet for fluid communication with a source or reservoir of the cladding material and an outlet in fluid communication with the inlet of the tube of the nozzle.

14. The powder injection nozzle according to claim 13, wherein delivery of the cladding material to the inlet of the feeder is pressurised.

15. The powder injection nozzle according to claim 1, further including:

a material feeder having an inlet and an outlet, the material feeder having a powder tube that defines the inlet of the material feeder for fluid communication with a source of cladding material, wherein a funnel is mounted to a distal end of the powder tube, wherein the funnel defines the outlet of the material feeder, and wherein the outlet of the material feeder is connected to the inlet of the tube such that the material feeder can deliver the cladding material to the tube, wherein the cladding material is delivered to the inlet of the material feeder in a pressurised state before entering a depressurised state such that the cladding material in the depressurised state travels from the inlet of the material feeder to the outlet of the material feeder by gravity feeding.

16. The powder injection nozzle according to claim 15, wherein the first adjustment mechanism includes a first housing and a first slide movably located within the first housing, the first slide being operatively connected to a first actuator, wherein activation of the first actuator causes a corresponding movement of the first slide relative to the first housing and thus a corresponding movement of the nozzle relative to the laser assembly.

17. The powder injection nozzle according to claim 16, wherein the second adjustment mechanism includes a second housing and a second slide movably located within the second housing, the second slide being operatively connected to a second actuator, wherein activation of the second actuator causes a corresponding movement of the second slide relative to the second housing and thus a corresponding movement of the nozzle relative to the laser assembly.

18. The powder injection nozzle according to claim 17, wherein the second adjustment mechanism is connected to the first slide such that the second adjustment mechanism is carried by the first adjustment mechanism, whereby movement of the first slide causes a corresponding movement of the second adjustment mechanism.

19. The powder injection nozzle according to claim 18, wherein the first actuator includes a first threaded rod which is threadingly engaged with the first slide, whereby rotation of the first threaded rod causes a corresponding linear translational movement of the first slide along the first axis; and wherein the second actuator includes a second threaded rod which is threadingly engaged with the second slide, whereby rotation of the second threaded rod causes a corresponding linear translational movement of the second slide along the second axis.

20. The powder injection nozzle according to claim 1, further including:

an adjusting assembly for adjustably mounting the powder injection nozzle to a laser assembly of the laser cladding system, wherein the adjusting assembly includes a first adjustment mechanism which is adapted to enable movement of the nozzle relative to the laser assembly along a first axis, and a second adjustment mechanism which is adapted to enable movement of the nozzle relative to the laser assembly along a second axis, the second axis being transverse to the first axis.

* * * * *